(12) United States Patent
Arenson et al.

(10) Patent No.: US 6,177,923 B1
(45) Date of Patent: *Jan. 23, 2001

(54) IMAGING MODALITY SHOWING ENERGY AND VELOCITY

(75) Inventors: James W. Arenson, Woodside, CA (US); Stanley S. C. Chim, Oakcreek, WI (US); Ismayil M. Guracar, Redwood City, CA (US); Samuel H. Maslak, Woodside, CA (US); Shuwu Wu, Garden Grove, CA (US); Carrie L. Peressini, Los Altos, CA (US); Janice L. Marshall, Sunnyvale, CA (US)

(73) Assignee: Acuson Corporation, Mountain View, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/736,895

(22) Filed: Oct. 25, 1996

Related U.S. Application Data

(63) Continuation-in-part of application No. 08/691,204, filed on Aug. 1, 1996, now abandoned, which is a continuation of application No. 08/367,064, filed on Dec. 30, 1994, now abandoned.

(51) Int. Cl.[7] .................................................. G09G 5/02
(52) U.S. Cl. ............................................ 345/150; 600/441
(58) Field of Search .................................... 345/150, 151, 345/112, 113, 114, 115, 117; 600/441, 442

(56) References Cited

U.S. PATENT DOCUMENTS

| | | |
|---|---|---|
| Re. 35,371 | 11/1996 | Seo . |
| 4,642,780 | 2/1987 | Thomson . |
| 4,800,891 | 1/1989 | Kim . |
| 4,928,698 | 5/1990 | Bonnefous et al. . |
| 5,014,710 | 5/1991 | Maslak et al. . |
| 5,078,146 | 1/1992 | Sato . |
| 5,107,841 | 4/1992 | Sturgill . |
| 5,148,808 | 9/1992 | Satake . |

(List continued on next page.)

FOREIGN PATENT DOCUMENTS

| | | |
|---|---|---|
| 3-094739 | 4/1991 | (JP) . |
| 96/21215 | 7/1996 | (WO) . |

OTHER PUBLICATIONS

Benson, *Television Engineering Handbook*, revised by Jerry Whitaker, Revised Edition, p. 4.4, (McGraw Hill 1992).

Bonnefous, et al., "Time Domain Formulation of Pulse–Doppler Ultrasound and Blood Velocity Estimation by Cross–Correlation," *Ultrasonic Imaging 8*, pp. 73–85 (1986).

Kasai, et al., "Real–Time Two–Dimensional Blood Flow Imaging Using an Autocorrelation Technique", *IEEE Transactions on Sonics and Ultrasonics* SU–32 (3):458–464 (May 1985).

Toshiba Corporation, *Sonolayer Phased Array Scanner with Color Doppler Imaging SSA–270A*, Product Brochure, Toshiba Corporation, Medical Systems Division, 1–1, Shibaura 1–Chome, Minato–Ku, Tokyo, 105, Japan (1990).

R. Omoto, M.D., *Color Atlas of Real–Time Two–Dimensional Doppler Echocardiography*, Shindan–To–Chiryo Co., Ltd. Tokyo, pp. 11–12, 115, 151 (1984).

*Primary Examiner*—Matthew Luu
(74) *Attorney, Agent, or Firm*—Morrison & Foerster LLP

(57) ABSTRACT

Both the energy and velocity contents of received Doppler and time shift signals are simultaneously displayed. A continuous range of imaging modes are provided ranging from velocity imaging to energy imaging. The user may select the particular imaging mode desired for a particular clinical application.

139 Claims, 15 Drawing Sheets

U.S. PATENT DOCUMENTS

| | | |
|---|---|---|
| 5,161,535 | 11/1992 | Short et al. . |
| 5,170,792 | 12/1992 | Sturgill et al. . |
| 5,211,169 | 5/1993 | Freeland . |
| 5,270,806 | 12/1993 | Venable et al. . |
| 5,285,788 | 2/1994 | Arenson et al. . |
| 5,291,892 | 3/1994 | O'Donnell . |
| 5,301,670 | 4/1994 | Sato et al. . |
| 5,329,929 | 7/1994 | Sato et al. . |
| 5,349,525 | 9/1994 | Dunki-Jacobs et al. . |
| 5,396,285 | 3/1995 | Hedberg et al. . |
| 5,443,071 | 8/1995 | Banjanin et al. . |
| 5,551,434 | 9/1996 | Iinuma . |

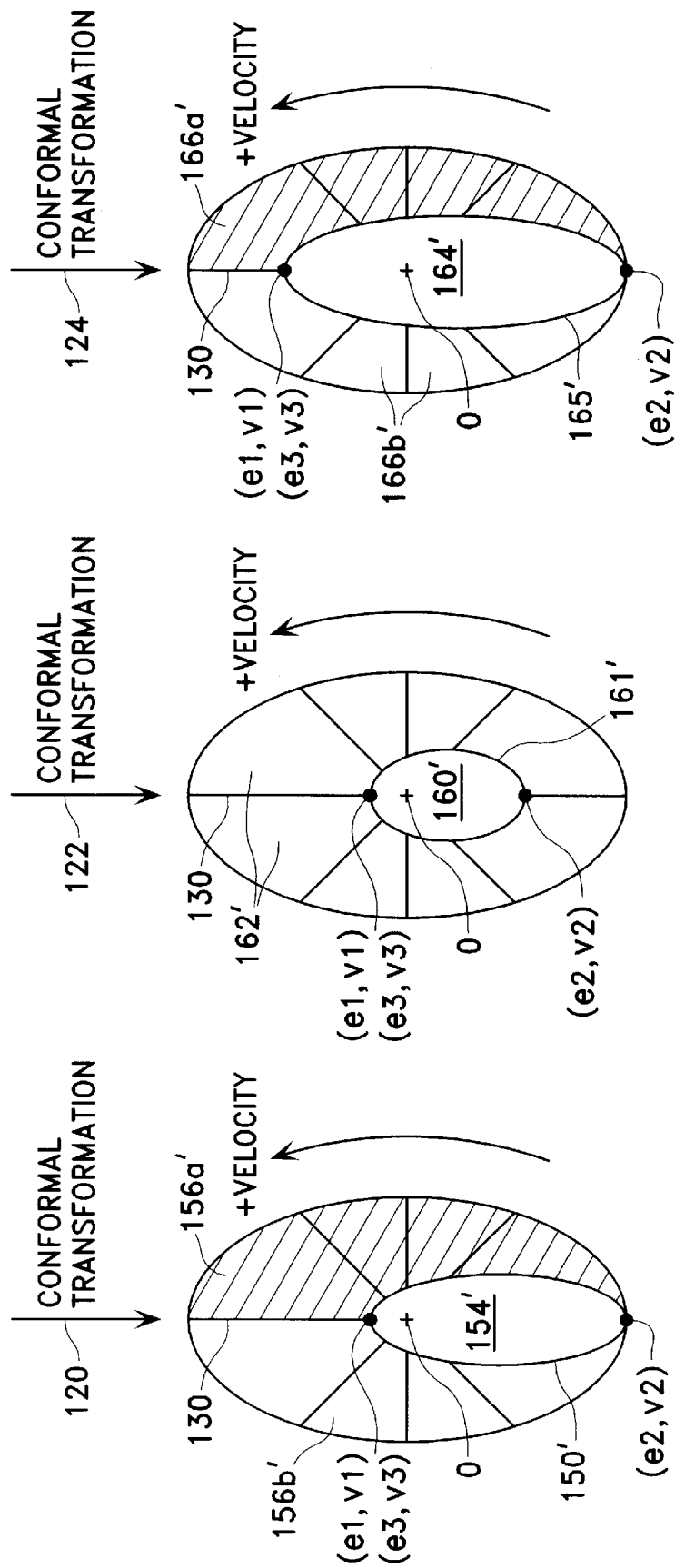

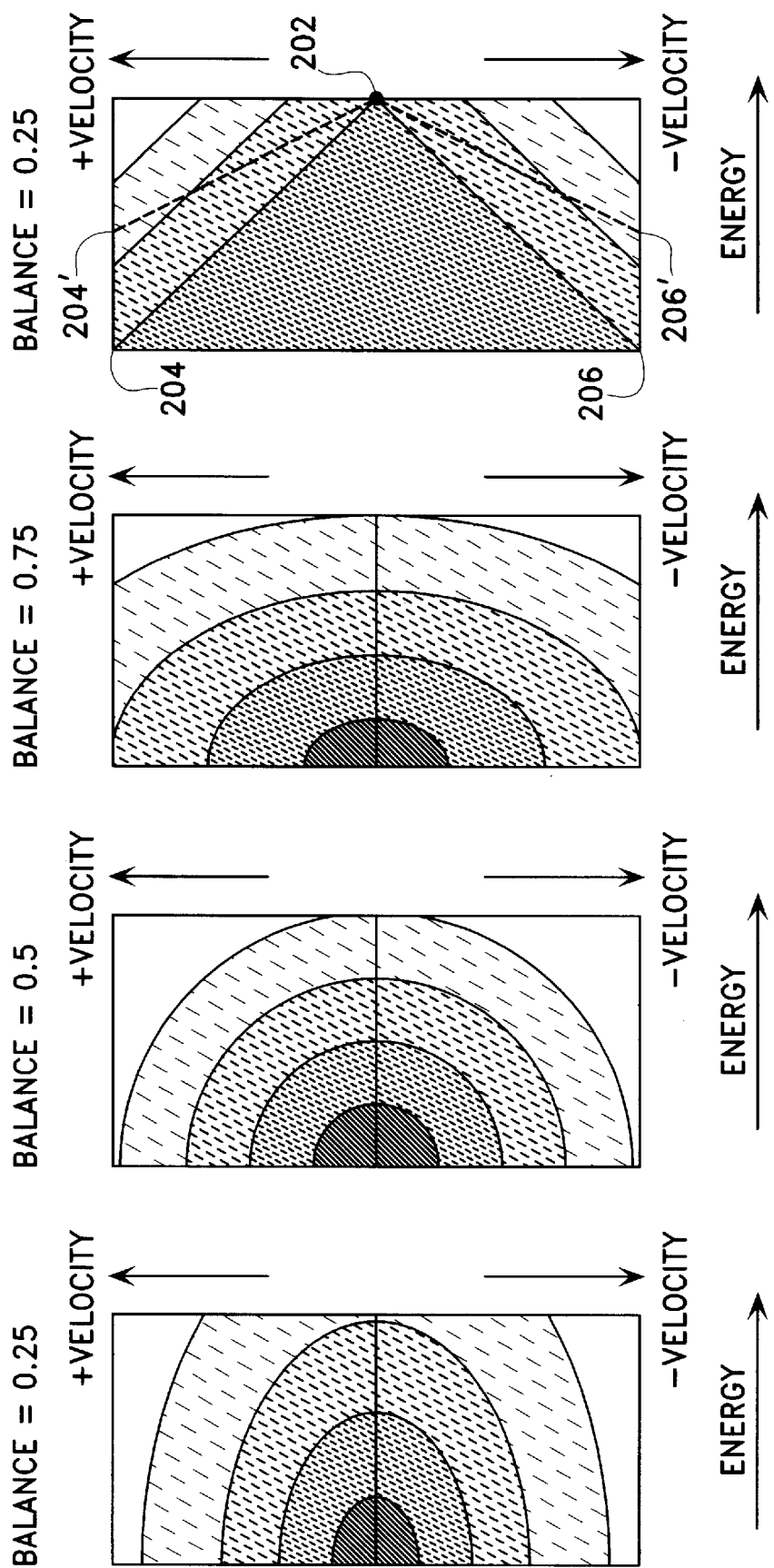

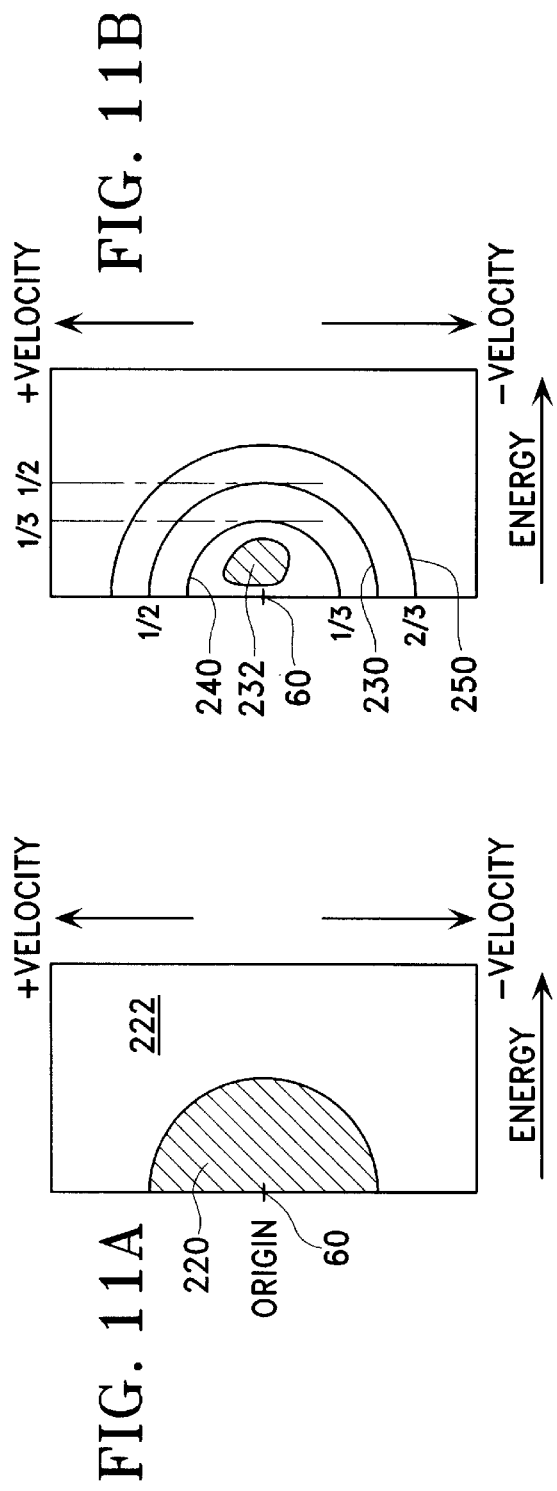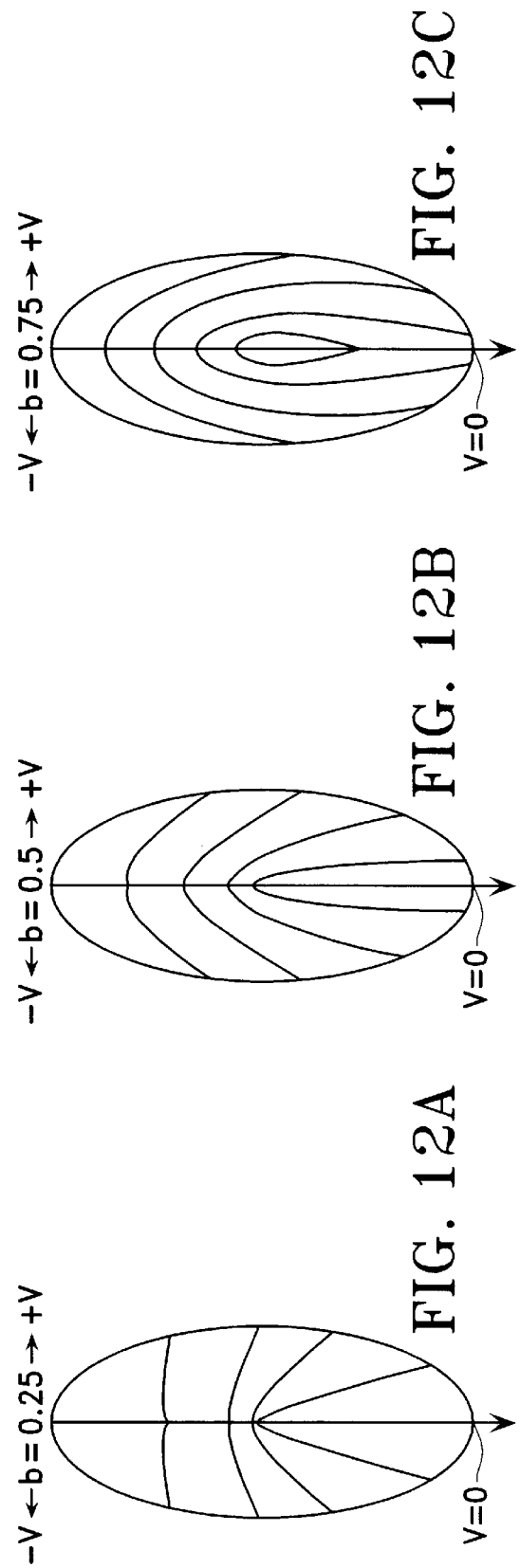

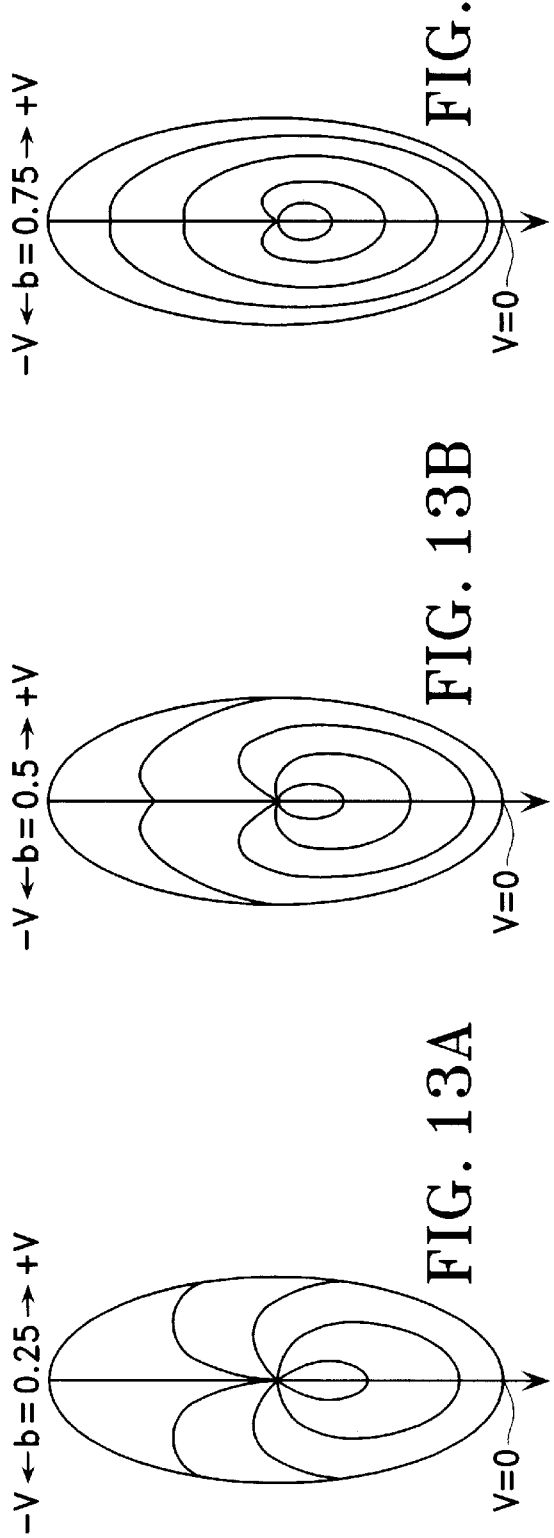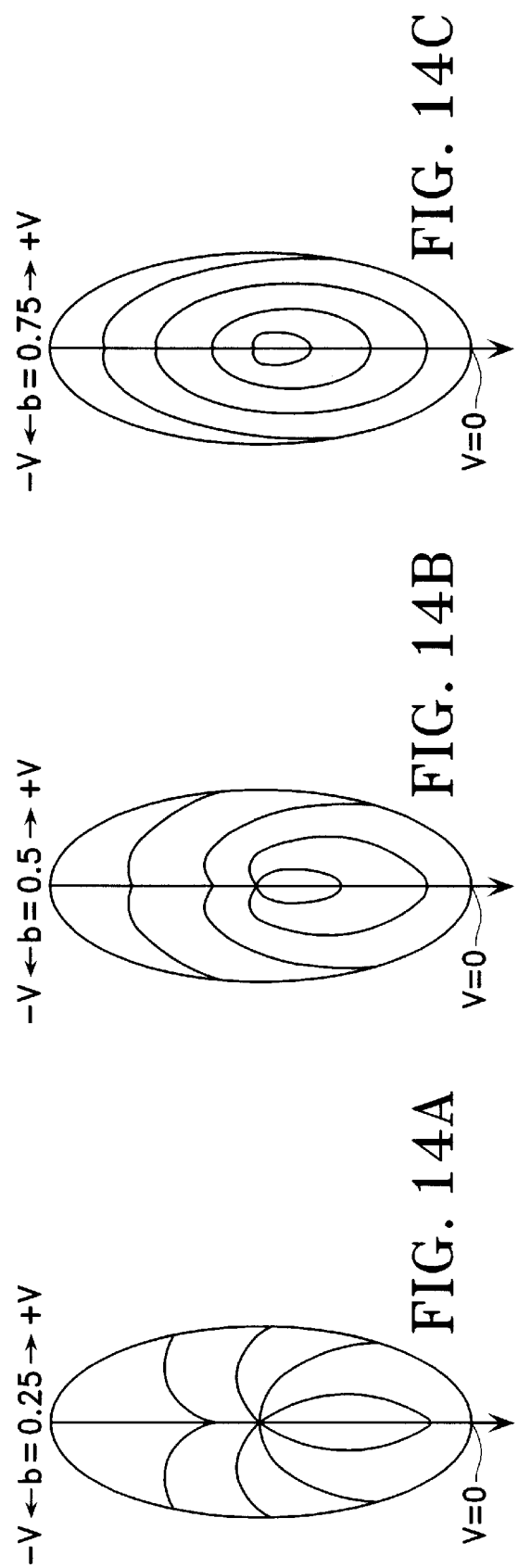

FIG. 18A

The following data lists RGB values ranging from )–FF hexadecimal which correspond to a range of video voltages applied to the color video monitor. The data below is an example of a directional energy color map with 5 emphases.

E_RED(d+) refers to the RED component values as a function of signal energy for the positive flow direction
E_GREEN(d+) refers to the GREEN component values as a function of signal energy for the positive flow direction
E_BLUE(d+) refers to the BLUE component values as a function of signal energy for the positive flow direction
E_RED(d−) refers to the RED component values as a function of signal energy for the negative flow direction
E_GREEN(d−) refers to the GREEN component values as a function of signal energy for the negative flow direction
E_BLUE(d−) refers to the BLUE component values as a function of signal energy for the negative flow direction Emphasis 1  E_RED(d+) = {0 11 22 33 45 52 5D 68 73 7D 81 86 8A 8F 93 96 9A 9D A2 A8 AD B3 B9 C2 CB D4 DD E5 EB F2 F7 FD}
E_GREEN(d+) = {0 0 0 1 1 2 4 6 7 A F 14 19 1F 24 29 2F 34 3B 45 50 5A 65 73 82 91 A0 B1 C5 D8 E9 F9}
E_BLUE(d+) = {10 D 9 6 2 1 1 1 1 1 1 1 1 1 1 1 1 1 1 1 1 1 1 1 1 1 1 1 1 1 1 1}
E_RED(d−) = {0 1 2 3 5 6 9 B E 11 14 18 1B 1F 20 20 20 21 22 24 26 28 28 29 29 2A 34 4B 61 78 8F}
E_GREEN(d−) = {0 2 4 5 6 A F 13 17 1C 24 2B 33 3B 41 47 4C 52 59 65 71 7D 88 92 9C A6 AF BC CD DE EE FF}
E_BLUE(d−) = {10 1E 2D 3B 4A 55 5D 65 6E 76 7F 88 91 99 A3 AD B8 C2 CA CE D1 D5 D8 DC DF E2 E5 E9 EF F4 FA FF}

Fig. 18

| Fig. 18A |
|----------|
| Fig. 18B |

```
Emphasis 2  E_RED(d+)   = {0 11 22 33 45 52 5D 68 73 7D 85 8D 96 9E A4 AA B0 B6 BC C1 C6 CC D1 D8 DE E5 EB F1 F4 F8 FB FE}
            E_GREEN(d+) = {0 0 0 1 1 3 6 9 C 10 18 20 28 30 39 44 4E 59 64 71 7D 8A 97 A3 B0 BC C8 D4 DE E9 F3 FC}
            E_BLUE(d+)  = {10 D 9 6 2 1 1 1 1 1 1 1 1 1 1 1 1 1 1 1 1 1 1 1 1 1 1 1 1 1 1 1}
            E_RED(d−)   = {0 1 2 3 5 6 9 BE 11 14 18 1B 1F 20 20 20 20 21 23 26 28 2B 2E 33 37 3B 43 52 61 70 7F}
            E_GREEN(d−) = {0 2 4 5 7 AF 13 17 1C 25 2E 37 3F 48 51 5B 64 6E 7E 8E 9D AD B9 C6 D2 DE E8 ED F3 F9 FF}
            E_BLUE(d−)  = {10 1E 2D 3B 4A 55 5D 65 6E 77 82 8E 99 A5 B1 BD CA D6 E0 E4 E8 EC EF F1 F3 F4 F5 F7 F9 FB FD FF}

Emphasis 3  E_RED(d+)   = {0 11 22 33 45 52 5D 68 73 7E 89 95 A1 AD B4 BA C0 C6 CD D6 DF E8 F1 F3 F4 F5 F5 F7 F9 FB FD FE}
            E_GREEN(d+) = {0 0 0 1 1 3 6 9 C 10 18 20 28 30 3G 4A 58 66 74 81 8D 9A A7 B2 BE C9 D4 DE EB EE F5 FC}
            E_BLUE(d+)  = {10 D 9 6 2 1 1 1 1 1 1 1 1 1 1 1 1 1 1 1 1 1 1 1 1 1 1 1 1 1 1 1}
            E_RED(d−)   = {0 1 2 3 5 6 9 BE 11 14 18 1B 1F 20 20 20 20 21 23 26 28 2B 2E 33 37 3B 43 52 61 70 7F}
            E_GREEN(d−) = {0 2 4 5 7 AF 13 17 1D 29 35 41 4D 59 65 71 7D 8A 98 A7 B5 C3 CB D2 DA E1 E8 ED F3 F9 FF}
            E_BLUE(d−)  = {10 1E 2D 3B 4A 55 5D 65 6E 77 82 8E 99 A5 B1 BD CA D6 E0 E4 E8 EC EF F1 F3 F4 F5 F7 F9 FB FD FE}

Emphasis 4  E_RED(d+)   = {0 11 22 33 45 53 5E 6A 75 81 90 9E AD BC C7 D0 DA E3 EB EC EE F0 F2 F3 F4 F5 F5 F7 F9 FB FD FE}
            E_GREEN(d+) = {0 0 0 1 1 3 6 9 C 11 1E 2B 37 44 54 64 74 84 93 9E A8 B3 BD C5 CD D4 DC E3 DA F1 F7 FD}
            E_BLUE(d+)  = {10 D 9 6 2 1 1 1 1 1 1 1 1 1 1 1 1 1 1 1 1 1 1 1 1 1 1 1 1 1 1 1}
            E_RED(d−)   = {0 1 2 3 5 6 9 BE 11 14 18 1B 1F 20 20 20 20 21 23 26 28 2B 2E 33 37 3B 43 52 61 70 7F}
            E_GREEN(d−) = {0 2 4 5 7 AF 13 17 1D 2A 37 43 50 5D 69 76 81 8D 9A A6 B2 BE C7 D0 D8 E0 E8 ED F3 F9 FF}
            E_BLUE(d−)  = {10 1E 2D 3B 4A 55 5F 68 71 7B 87 94 A0 AC B9 C5 D0 DC E6 E8 EB ED F0 F1 F3 F4 F5 F7 F9 FB FD FF}

Emphasis 5  E_RED(d+)   = {0 11 22 33 45 53 61 6E 7B 88 99 AA BB CD D5 DC E3 EA EF F0 F1 F2 F3 F4 F5 F5 F7 F9 FB FD FE}
            E_GREEN(d+) = {0 0 0 1 1 4 B 11 17 1E 2F 40 51 62 70 7D 8A 97 A2 AA B3 BB C3 C9 D0 D6 DC E3 EA F1 F7 FD}
            E_BLUE(d+)  = {10 D 9 6 2 1 1 1 1 1 1 1 1 1 1 1 1 1 1 1 1 1 1 1 1 1 1 1 1 1 1 1}
            E_RED(d−)   = {0 1 2 3 5 6 9 BE 11 14 18 1B 1F 20 20 20 20 21 23 26 28 2B 2E 33 37 3B 43 52 61 70 7F}
            E_GREEN(d−) = {0 2 4 5 7 E 19 24 2F 3A 46 53 60 6C 77 80 8A 93 9C A5 AE B6 BF C7 D0 D8 E0 E8 ED F3 F9 FF}
            E_BLUE(d−)  = {10 1E 2D 3B 4A 57 64 71 7E 8B 97 A4 B0 BC C6 CE D7 DF E6 E8 ED F0 F1 F3 F4 F5 F7 F9 FB FD FF}
```

FIG. 18B

IMAGING MODALITY SHOWING ENERGY AND VELOCITY

CROSS-REFERENCE TO RELATED APPLICATIONS

This application is a continuation-in-part of application Ser. No. 08/691,204, filed Aug. 1, 1996, now abandoned, which is a continuation of application Ser. No. 08/367,064, filed Dec. 30, 1994 now abandoned.

BACKGROUND OF THE INVENTION

This invention relates to an imaging modality displaying signals containing both velocity and energy information derived from echoes of ultrasound signals from fluid flow or tissue motion, where the signals are represented by display features obtained from the energy and velocity information according to two-dimensional display feature maps. As used in the description herein below, the term "velocity" means the mean velocity and the terms "velocity" and "mean velocity" are used interchangeably, such as in the case of the velocity (i.e., mean velocity) of fluid flow and tissue motion.

Conventional Methods

Color Doppler imaging has been in use for more than a decade. The conventional color Doppler modalities are briefly described as follows:

I. Color Doppler velocity imaging

This is the most common color Doppler imaging mode where only the velocity component of the received Doppler signal is shown. FIG. 1A is a typical color map which is used to show flow velocities and directions. The upper and lower color bars in FIG. 1A may be composed of varying intensities and hues of color to show different velocity flow components. The upper and lower bars may be constructed from different color combinations to distinguish positive and negative flows. A baseline with no color is usually included to inhibit the representation of the lowest velocity flow states where the ultrasound system is not as reliable in detecting directional flows, or to remove stationary clutter signals.

II. Color Doppler Velocity and Variance Imaging

In this imaging mode, both the variance and velocity components of the received Doppler signal are estimated. The color map for color Doppler velocity and variance imaging is similar to the one in FIG. 1A, except that the top and bottom right corners of the color map are used to show flow variance while flow velocity is color-coded using the rest of the color map. This mode is especially useful for illustrating turbulent Doppler flow since flow turbulence is usually characterized by high flow velocities and variances.

III. Color Doppler Energy Imaging

Color Doppler energy imaging is recently recognized as an important color Doppler mode for perfusion imaging. In this mode, only the energy (or squared modulus) component of a received Doppler signal is shown. While the rotating phase of a Doppler signal is used to estimate its velocity and variance components, the squared modulus of the same signal is used for calculating the signal energy or power. Since phase detection is less accurate than square modulus detection especially in the case where signal-to-noise ratios (SNR) are low, the same Doppler system provides more sensitivity in energy imaging compared to velocity and variance imaging. Color Doppler energy imaging thus becomes a dominant mode for perfusion imaging where the perfusion signal is usually weak and may easily be submerged by noise. FIG. 1B is a typical color map for energy imaging in which only the energy components are color-coded.

IV. Color Doppler Energy and Velocity Imaging

In the early days of medical ultrasound imaging, people had unsuccessfully attempted a combined energy and velocity imaging mode. In this conventional combined mode, typically the top and bottom right corners of the color map are used to show flow energy while flow velocity is color-coded using the rest of the color map. This mode is not useful for perfusion imaging because only the high energy levels are shown; the low energy levels (perfusion signals) are not color-coded. While this mode was available on early color Doppler imaging systems, it was not adopted by clinical users and has since been removed from most, if not all, of the current color Doppler systems.

Disadvantages of the Above Conventional Methods

One clinical objective of this disclosure is to provide a color Doppler imaging mode which is capable of tissue perfusion imaging and providing flow velocities and directions at the same time. From the discussion in the previous section, it is clear that neither color Doppler velocity nor velocity/variance imaging can provide the necessary sensitivity desired for tissue perfusion imaging. Similarly, the above-described conventional color Doppler energy and velocity imaging mode is unsuitable for perfusion imaging.

Although color Doppler energy imaging provides the desired sensitivity, it is unable to distinguish flow directions and velocities. For example, in the diagnosis of liver cirrhosis, it is clinically significant to be able to observe liver perfusion in the tissue and flow directions in the larger blood vessels simultaneously.

From the above, none of the conventional methods is entirely satisfactory. It is therefore desirable to provide a new and improved imaging modality with improved information display capabilities.

SUMMARY OF THE INVENTION

While the term "velocity" is used in this application, it should be understood that the quantity "velocity" processed here can be derived from the Doppler frequency shift, and the mean Doppler frequency or wavelength estimate is converted to a mean velocity estimate by use of the well-known Doppler equation:

$$v = f_D c / 2 f_o \cos\theta$$

where $f_D$ is the Doppler frequency shift, c is the speed of sound, $f_o$ is the transmitted frequency and $\theta$ is the Doppler angle or the angle subtended by the ultrasound beam and the direction of flow. Therefore, it will be understood that whenever "mean velocity" is referred to in the application, "mean frequency" or "mean wavelength" may be used instead; such variations are within the scope of the invention. For simplicity, the term "mean velocity related parameter" of a signal in this application will mean "mean velocity", "mean frequency" and/or "mean wavelength" of the signal. Similarly, instead of processing energy of the Doppler information or time shift signals, it is possible to process the power or amplitude of such signals instead; where power is the energy of such signals per unit time, and amplitude is proportional to the square root of power. For simplicity, again the term "energy related parameter" of a signal in this application will mean "energy" and/or "power" and/or "amplitude" of the signal and the last three terms in quotations are used interchangeably.

The invention of this application involves a system where a number of signals are supplied that contain information including velocity and energy of fluid flow or tissue motion. The information on velocity and energy of fluid flow or tissue motion is then coded into display features, and the display feature is displayed on the display medium. The system includes a subsystem for coding according to a coding scheme the velocity and energy information of the signals as the display features to be displayed. Therefore, whenever an aspect of the invention is set forth below as directed to an overall system including signal acquisition and display of display features, a separate aspect of the invention is directed to the coding scheme of the subsystem. In the preferred embodiment, the display features to be displayed are the colors selected as functions of the signals.

One aspect of the invention is directed towards a method for displaying information comprising the following steps. A plurality of signals are supplied containing information including mean velocity and energy of fluid flow or tissue motion. A boundary is provided in a two variable, two-dimensional display feature space, said variables being a mean velocity related parameter and an energy related parameter, each of the magnitude of mean velocity related parameter and energy related parameter having a minimum value for said plurality of signals at a point defining an origin in the space. The boundary divides the space into a first and a second region, said first region containing the origin. For each signal, a display feature is obtained that is a function only of the energy related parameter when the energy related and mean velocity related parameters of the information in such signal correspond to a point in the first region. The display feature so obtained is then displayed on the display medium. Another aspect of the invention is directed to a subsystem including the provision of the boundary and the obtaining of the display feature as described immediately above.

Another aspect of the invention is directed towards a method for displaying information comprising the following steps. The first step is to supply a plurality of signals containing information including mean velocity and energy of fluid flow or tissue motion. A boundary in a two variable, two-dimensional display feature space is provided, said variables being a mean velocity related parameter and an energy related parameter. The boundary includes pairs of threshold values of the mean velocity related parameter and the mean energy related parameter of the information of the signal. The boundary is a single-valued function of the energy related parameter or the mean velocity related parameter. The mean velocity related parameter and energy related parameter of the information in each of the signals are compared with the threshold values of said boundary. Where the boundary is a single valued function of the mean velocity related parameter, for each signal, a display feature is selected that is a function only of the energy related parameter where the energy related parameter of information in such signal is below the energy related parameter of a threshold pair that has the same mean velocity related parameter as the information of such signal. Where the boundary is a single-valued function of the energy related parameter, for each signal, a display feature is selected that is a function only of the energy related parameter when the magnitude of the mean velocity related parameter of such signal is less than the magnitude of the mean velocity related parameter of a threshold pair that has the same energy related parameter as such signal. Another aspect of the invention is directed towards a subsystem in which the comparing and selecting steps described immediately above are performed.

Another aspect of the invention is directed towards a method for displaying information comprising the following steps. A plurality of signals are supplied containing information including mean velocity and energy of fluid flow or tissue motion. A two variable, two-dimensional display feature space is provided, where the variables are a mean velocity related parameter and an energy related parameter. Each of the magnitude of mean velocity related parameter and energy related parameter has a minimum value for said plurality of signals at a point defining an origin in the space. For each signal, a display feature is selected that is a function of both the energy related and mean velocity related parameters of information in such signal where the energy related and mean velocity related parameters of the information in such signal correspond to a point in a region containing the origin. The display feature selected is then displayed on a display medium. Another aspect of the invention is directed towards a subsystem where the providing and selecting steps described immediately above are performed.

Yet another aspect of the invention is directed towards a method for displaying information comprising the following steps. A plurality of signals are supplied containing information including mean velocity and energy of fluid flow or tissue motion. A two variable, two-dimensional display feature space is provided, said variables being a mean velocity related parameter and an energy related parameter. For said plurality of signals, the magnitude of the mean velocity related parameter has a predetermined range of values and the energy related parameter has a dynamic range. For each signal, a display feature is selected that is a function of both the energy related and mean velocity related parameters of information in such signal where the energy related and mean velocity related parameters of the information in such signal are within a region in the lower half of said predetermined range and of said dynamic range. The display feature selected is then displayed on the display medium. Another aspect of the invention is directed towards a subsystem including the providing and selecting steps described immediately above.

Still another aspect of the invention is directed towards a method for displaying information comprising the following steps. A plurality of signals are provided containing information on mean velocity and energy of fluid flow or tissue motion. The plurality of signals have a predetermined range of values for a mean velocity related parameter and a predetermined dynamic range of values for an energy related parameter. Display features are selected to represent the signals by mapping the mean velocity related parameter and the energy related parameter information of each of the signals onto a two-dimensional display feature space according to a mapping function, wherein said mapping function is substantially continuous. The display features selected are then displayed on a display medium. Another aspect of the invention is directed towards a subsystem including the step for providing the two variable, two-dimensional display space and the selecting step described immediately above.

Another aspect of the invention is directed towards a method for displaying information comprising the following steps. A plurality of signals are supplied containing information including mean velocity and energy of fluid flow or tissue motion. A two variable, two-dimensional color space is provided, where the variables are a mean velocity related parameter and an energy related parameter. For each signal, a color is selected by representing the luminance of such color as a function of the magnitude of the mean velocity related parameter and/or the energy related parameter of the information in such signal in said color space. The color is then displayed on the display medium. Still another aspect of the invention is directed to a subsystem where the providing and selecting steps described immediately above are performed.

Yet another aspect of the invention is directed towards a method for identifying colors for displaying a plurality of signals containing information on mean velocities and energies of fluid flow or tissue motion, comprising the following steps. The first step is to form a one-dimensional mean velocity related parameter YUV map and a one-dimensional energy related parameter YUV map of said signals to colors in YUV space. A two-dimensional mean velocity related parameter and energy related parameter YUV map is then constructed from said mean velocity related parameter and energy related parameter maps to identify colors for displaying said signals.

One more aspect of the invention is directed towards a method for displaying information comprising the following steps. Signals are provided containing information on mean velocity and energy of fluid flow or tissue motion. Colors are selected to represent the signals by mapping the mean velocity related parameter and the energy related parameter information of each of the signals onto a two variable, two-dimensional color space. The two variables are the mean velocity related parameter and the mean energy related parameter. The mapping is performed according to a function where luminance of the color increases monotonically with the energy related parameter and/or magnitude of the mean velocity related parameter of the information in the signals. The colors are then displayed on the display medium. Another aspect of the invention is directed towards a subsystem, including the step of providing a monotonically increasing function of the type described immediately above, and the selecting step described immediately above.

Still another aspect of the invention is directed towards a method for displaying information comprising the following steps. Signals are provided containing information on mean velocity and energy of fluid flow or tissue motion. Display features are selected to represent the signals by mapping the mean velocity related parameter and the energy related parameter information of each of the signals onto a two variable, two-dimensional display feature space, where the two variables are the mean velocity related and energy related parameters. The mapping is performed according to a function where display feature is a function of the mean velocity related parameter and the energy related parameter of the signals. The selecting step includes the step of altering the function to increase or decrease dependence of the display feature selected on the energy related parameter information compared to dependence of the display feature selected on the mean velocity related parameter information. The display features are then displayed on the display medium. Another aspect of the invention is directed towards a subsystem where the mapping and altering steps described immediately above are performed.

Still another aspect of the invention is directed towards an apparatus for displaying information comprising means for storing a function for deriving display features from signals containing information on at least two of three quantities: mean velocity related parameter, variance of velocity, and energy related parameter of fluid flow or tissue motion. The apparatus further includes means responsive to user input for altering the function to increase or decrease dependence of the display feature on one quantity relative to dependence of the display feature on another quantity; and a display medium displaying the display feature. Another aspect of the invention is directed towards a subsystem of said apparatus which includes the storing means and the altering means described immediately above.

Yet one more aspect of the invention is directed towards a method for displaying information comprising the steps of storing a function for deriving display features from signals containing information on at least two of three quantities: mean velocity related parameter, variance of velocity and energy related parameter of fluid flow or tissue motion. The method further includes altering the function according to user input to increase or decrease dependence of the display feature on one quantity relative to dependence of the display feature on another quantity; and displaying said display features on the display medium. Another aspect of the invention is directed towards a subsystem including the storing and altering steps described immediately above.

One more aspect of the invention is directed towards a method for displaying information comprising supplying a plurality of signals containing information which includes mean velocity and energy of fluid flow or tissue motion; and providing a plurality of display feature maps for mapping a display feature to a pair of values for a mean velocity related parameter and an energy related parameter. The maps include at least one map employing a threshold mode function and at least one map employing a mixed mode function. A first one of the maps is chosen and a first set of display features using the chosen map is selected for the signals and the first set of display features are displayed on the display medium. Another aspect of the invention is directed towards a subsystem of the method described immediately above. The subsystem includes providing a plurality of display feature maps for mapping a display feature to a pair of values for the mean velocity related parameter and the energy related parameter, said maps including at least one map employing a threshold mode function and at least one map employing a mixed mode function. The method further comprises storing the maps in a storage medium.

BRIEF DESCRIPTION OF THE DRAWINGS

FIGS. 6A–6C are color maps in Cartesian coordinates.

FIGS. 7A–7C are color maps in polar coordinates obtained from the color maps in FIGS. 6A–6C respectively by conformal transformation.

FIGS. 9A–9C are color maps in Cartesian coordinates illustrating another embodiment of the mixed mode of this invention at three different user balance settings where colors are selected as an elliptical function of the energy and magnitude of velocity.

FIG. 10 is a color map in Cartesian coordinates illustrating yet another embodiment of the mixed mode of this invention at a user balance setting where colors are selected as a linear function of the energy and magnitude of velocity.

FIGS. 11A, 11B are color maps of the mixed mode to illustrate a more general conception of the invention.

FIGS. 12A–12C are color maps in polar coordinates obtained by conformal transformations of FIGS. 8A–8C respectively.

FIGS. 13A–13C are color maps in polar coordinates obtained by conformal transformations of FIGS. 9A–9C respectively.

FIG. 14B is a color map in polar coordinates obtained by conformal transformations of FIG. 10.

FIGS. 14A, 14C are color maps in polar coordinates obtained by changing the balance setting from that of FIG. 14B.

FIG. 18 illustrates RGB look up tables for five emphasis settings in directional energy mode.

For convenience in description, identical components, features, lines or points are identified by the same numerals in this application.

DETAILED DESCRIPTION OF THE INVENTION

Figure 2:
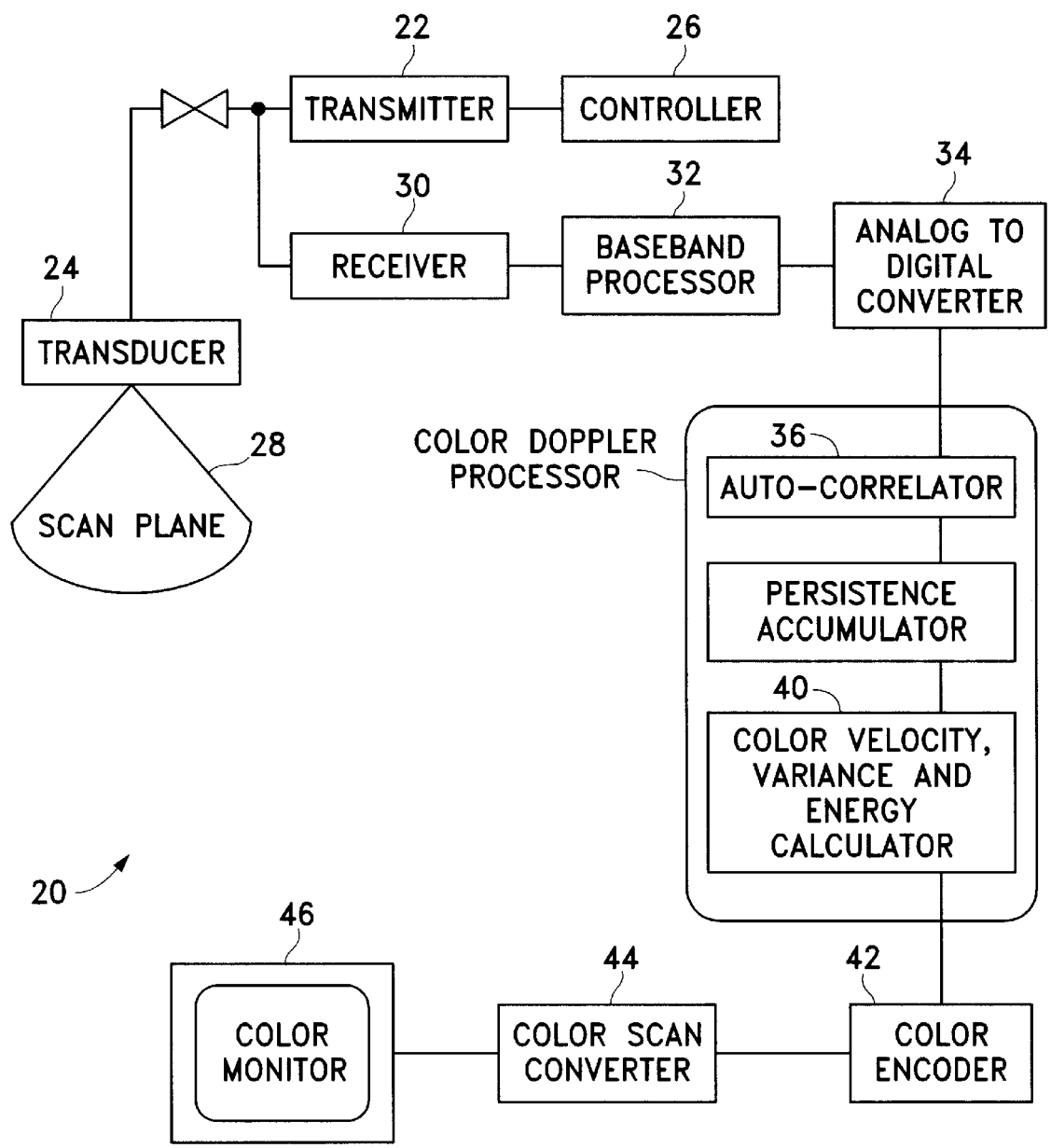
FIG. 2 is a block diagram of a color Doppler imaging system useful for illustrating the invention.

FIG. 2 is a block diagram of a system 20 for color Doppler imaging useful for illustrating the invention. System 20 includes a transmitter 22 which excites the transducer 24 under the control of controller 26. Transducer 24 propagates ultrasonic bursts into a body (not shown) in a scan plane 28. Transducer 24 may propagate the ultrasonic bursts along different scan lines in the scan plane to scan a region of interest in the body to provide signals for color Doppler imaging. Alternatively, transducer 24 may propagate ultrasonic bursts along a single scan line in what is known as the M mode. In both cases, transducer 24 senses the echo from the body in response to the ultrasonic bursts, and a signal representative of the echo is processed by receiver 30, downshifted to and filtered at its baseband by processor 32 and then digitized by converter 34. The digitized signals are then autocorrelated by autocorrelator 36, and then persisted by persistence accumulator 38 temporally and/or spatially. The mean velocity related parameter, variance of velocity and energy of fluid flow or tissue motion in the body are then calculated from the persisted signals by calculator 40. These three fluid flow or tissue motion parameters are then encoded by color encoder 42 into color signals such as red, green and blue pixel values. These values are scan converted by color scan converter 44 into the raster format and then displayed on color monitor 46.

This invention is directed to systems within the color encoder for encoding the mean velocity, variance of velocity and energy information into color signals for display on color monitor 46. As is well-known to those skilled in the art, the velocity of fluid flow or tissue motion is proportional to the Doppler frequency shift information in the signals received by receiver 30. Therefore, an alternative is to color encode the mean Doppler frequency shift information which is equivalent to color encoding the mean velocity information. In such event, calculator 40 is then adapted to calculate the mean Doppler frequency (or wavelength) shift information instead of the mean velocity information. Since the process for color encoding mean Doppler frequency shift information is exactly the same as color encoding the mean velocity information, it will be understood that where color encoding of mean velocity is concerned in the specification and claims of this application, color encoding of mean Doppler frequency (or wavelength) shift is included also, and may be substituted therefor.

In the description up to this point, the mean velocity, variance and velocity and energy information are derived from Doppler information signals derived as described above in reference to FIG. 2. The mean velocity and energy of fluid flow or tissue motion can also be derived using timeshift information instead of Doppler information, as described in U.S. Pat. No. 4,928,698 and "Time Domain Formulation of Pulse-Doppler Ultrasound and Blood Velocity Estimation by Cross Correlation," by Bonnefous et al., Ultrasonic Imaging B, 73–85 (1986). This patent and article describe a system employing timeshift information for deriving the velocity and energy related to blood flow and motion of organs. A system for implementing such scheme may be arrived at by slight modification of FIG. 2, such as by omitting the baseband processor so that the echo received by receiver 30 is not downshifted to baseband as in FIG. 2, but simply converted to digital samples by converter 34. Instead of performing autocorrelation, the digital samples are cross-correlated by a cross-correlator to provide at its output energy and mean velocity of the fluid flow or tissue motion in the body. Color encoder 42 then performs the color encoding on the energy and mean velocity to provide color signals for display on monitor 46. Thus the data acquisition part of the invention includes the processing of echoes to obtain Doppler as well as time shift information.

The Threshold Mode

The threshold mode aspect of the invention will now be described in reference to FIG. 3A. The different shading in the color bars in FIG. 3A and other figures illustrates the different brightness and hue of the color that are selected at points within the bars corresponding to the energy and velocity values of the points, in the same manner as in the conventional schemes illustrated in FIGS. 1A, 1B.

Figure 3A:
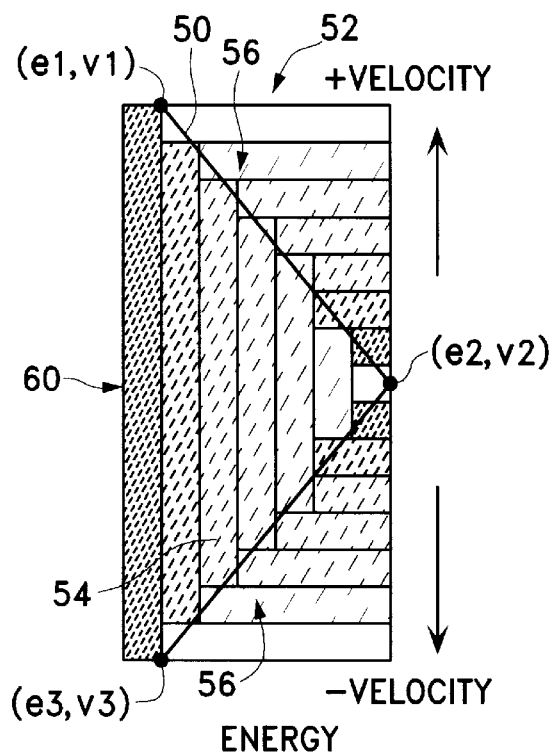
FIGS. 3A–3D are color maps illustrating the threshold mode of this invention, where the threshold is determined in accordance to a boundary consisting of two straight lines to illustrate an embodiment of the invention.

As shown in FIG. 3A, a boundary 50 is provided in the two variable, two-dimensional color space 52, where the two variables are energy and mean velocity. A color is then selected according to a mapping function which relates a color to a pair of energy and mean velocity values. Positive mean velocities are shown separate from negative mean velocities. The boundary consists of a first straight line from the point (e1, v1) to (e2, v2), and a second straight line from the point (e2, v2) to (e3, v3). Thus, boundary 50 divides the color space 52 into two regions: a first region 54 and a second region 56. Region 54 is distinguished from region 56 in that it includes a point in space 52 where both the magnitude of velocity and energy are minimal. This point is at 60 and defines the origin of space 52. Since region 54 is characterized by the fact that it includes point 60 where the energy is minimum, region 54 contains the portion of the color space for encoding signals containing information indicating low energy fluid flow or tissue motion. Therefore, the color map of FIG. 3A is particularly advantageous for perfusion imaging. For perfusion imaging where SNR is low, the estimation of mean velocity and variance components of a Doppler signal is not as accurate as the estimation of signal energy. Since the perfusion signal is usually weak and may easily be submerged by noise, it is particularly advantageous to color encode perfusion signals as a function of its energy information content rather than its velocity information content.

In region 56, the Doppler or time shift signal either indicates high energy fluid flow or tissue motion or low energy but high velocity fluid flow or tissue motion; in such event, the clinician may have more confidence in the phase information in the Doppler signal and, therefore, the velocity information content of the Doppler signal. Hence, where the mean velocity and energy of a signal to encoder 42 is in region 56, such signal is color-encoded using its velocity information content and not its energy information content. This will preserve the dynamically changing velocity characteristics of the fluid flow or tissue motion in the actual display on color monitor 46.

Once the color encoder 42 fetches a color based on color map 52, signals indicating such color ("color signals") at the encoder output are then sent to converter 44 where the signals are scan converted to raster format and displayed on monitor 46.

Encoder 42 may be implemented simply by a lookup table constructed as follows. First, a predetermined range of possible velocities and a dynamic range for energy are determined, thereby determining the scale and values of the two axes of color map 52. Then the table is constructed by matching the output colors in map 52 to input mean velocity and energy values in map 52 as shown in FIG. 3A. Such table is then stored in a memory such as a PROM in encoder 42. Then when the mean velocity and energy of a signal are inputted to encoder 42, the lookup table in encoder 42 will supply the corresponding color according to map 52. The design of lookup tables and their operation are well known to those skilled in the art and will not be described in detail here. As shown in FIG. 3A, the encoding scheme involves changes in luminance and/or chrominance when the energy and/or magnitude of the velocity increase. Changes in shading in map 52 indicates changes in intensity and/or hue. In FIG. 3 as well as other figures of this application with shaded bars or contours, bars or contours with the same shading have the same intensity and/or hue. Origin 60 is located at the minimum value of the predetermined range of mean velocity and the minimum value of the dynamic range for energy.

As shown in FIG. 3A, the direction of tissue motion or fluid flow can be indicated by different colors, such as where positive velocities are indicated by red color and negative velocities indicated by a blue color. In this manner, it is possible to observe low energy perfusion signals and flow directions simultaneously, such as would be useful in a diagnosis of liver cirrhosis. A third color may be used for region 54. Where flow direction is not important, it may be desirable to encode both positive and negative velocities using the same color, so that the image presented on monitor 46 is less cluttered by unnecessary contrast between two different colors for coding different flow directions.

Figure 3B:
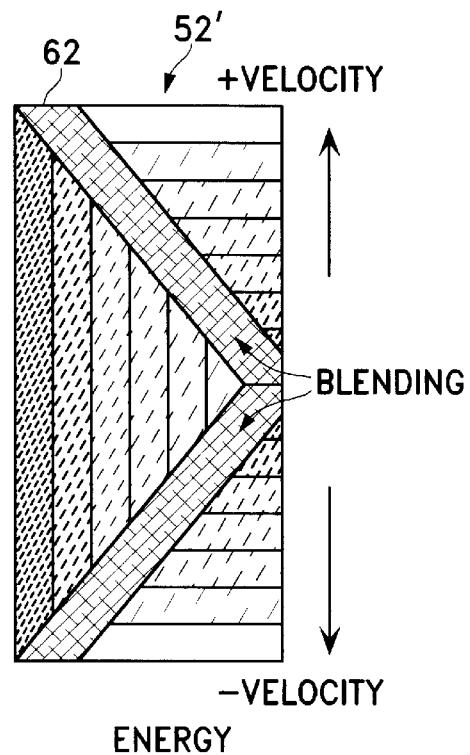

FIG. 3B illustrates a color map 52' essentially the same as map 52 in FIG. 3A, except that in addition to regions 54, 56, there is a third region 62 including the boundary, where the third region is a transition zone in which filtering is performed to enable a smoother transition of colors in the actual display on monitor 46. This is illustrated more clearly in reference to FIG. 3B and FIG. 3E which shows an enlarged portion of the color map in FIG. 3B. As shown in FIG. 3E, for any point within the third region 62, the color for such point is arrived at by means of a simplified (i.e., the four corner points of a 3×3 square are omitted or their corresponding four coefficients set to zero) 3×3 two dimensional filter with five non-zero coefficients for calculating the average of the color pixel value for such point and the four surrounding pixels. For example, for a point 64 in FIG. 3E, the color at point 64 is arrived at by taking a simple or weighted average of the color value at such point together with the colors at the four surrounding points 66, according to the relations shown below.

$$R'(e,v)=(1-2Ce)(1-2Cv)R(e,v)+Ce(1-2Cv)[R(e-\Delta e,v)+R(e+\Delta e,v)]$$

$$+Cv(1-2Ce)[R(e, v-\Delta v)+R(e, v+\Delta v)];$$

$$G'(e, v)=(1-2Ce)(1-2Cv)G(e, v)+Ce(1-2Cv)[G(e-\Delta e, v)+G(e+\Delta e, v)]$$

$$+Cv(1-2Ce)[G(e,v-\Delta v)+G(e,v+\Delta v)];$$

$$B'(e,v)=(1-2Ce)(1-2Cv)B(e,v)+Ce(1-2Cv)[B(e-\Delta e,v)+B(e+\Delta e, v)]$$

$$+Cv(1-2Ce)[B(e, v-\Delta v)+B(e, v+\Delta v)];$$

where, e is energy, $\Delta e$ is energy increment;
v is velocity, $\Delta v$ is velocity increment;
Ce, Cv are quantities used in the filter coefficients;
R, G, B are red, green, blue values before smoothing;
R', G', B' are red, green, blue values after smoothing using the simplified 3 by 3 filter.

In order to derive the transition zone 62, first threshold curve such as 50 in FIG. 3A is defined. Then the current lookup table for regions 54 and 56 are generated in a manner described above in reference to FIG. 3A. Transition zone 62 is defined by an "equal width" scheme so that the threshold curve or boundary 50 is the center of the transition zone 62. Then the two-dimensional smoothing operation is performed for all points in the transition zone in red, green and blue space. A simple way to achieve the two-dimensional smoothing is by using the above referenced simplified 3×3 kernel or filter.

Figure 3C:
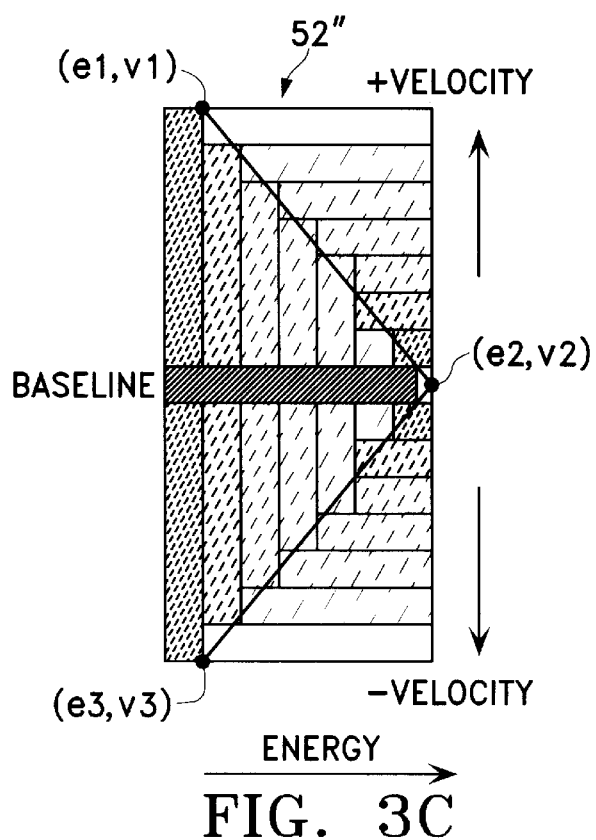
Figure 3D:
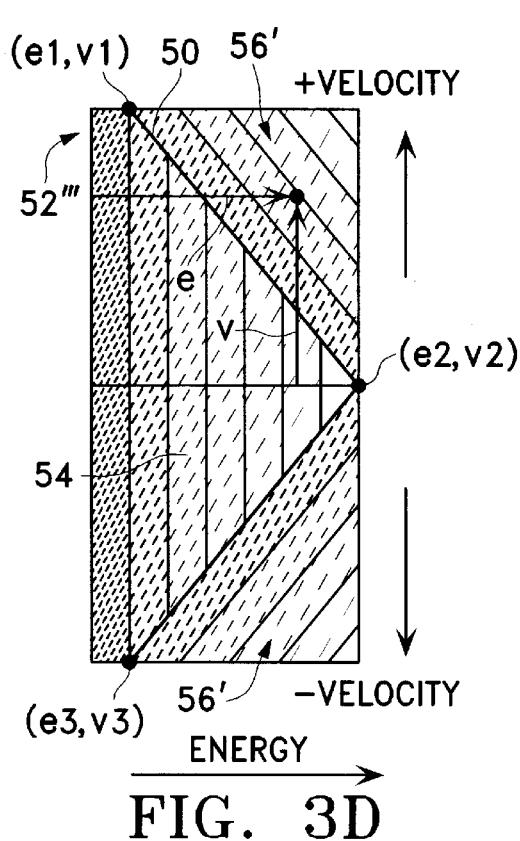
Figure 3E:
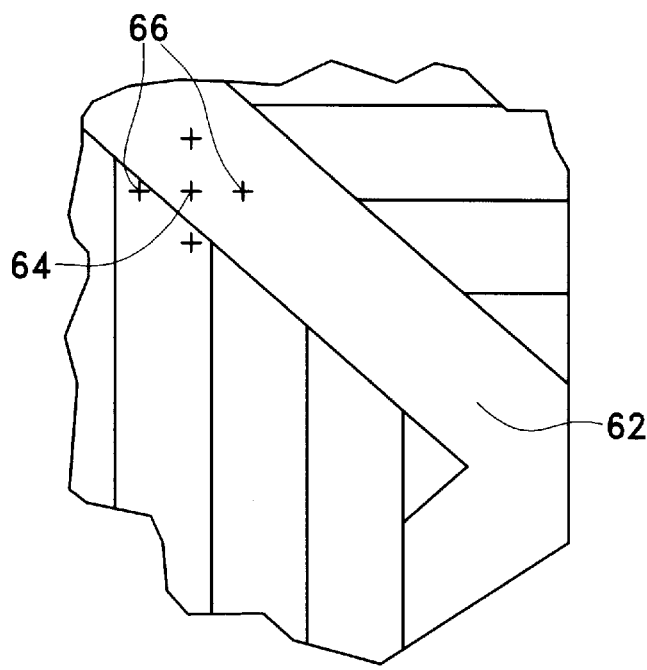
FIG. 3E is a portion of the color map of FIG. 3B illustrating a filtering or averaging function for use in the threshold mode color map.

FIG. 3C illustrates another color map 52" which is different from that of FIG. 3A only in that a base line is included where no color is shown to inhibit the representation of the lowest velocity flow state where the ultrasound system is not as reliable in detecting directional flows, or to remove stationary clutter signals. FIG. 3D is a color map 52'" similar to that in FIG. 3A, except that in region 56', instead of selecting a color as a function only of the velocity information content of the signal to encoder 42 as in FIG. 3A, a color is selected that is a function of both the mean velocity and energy information in the signal. It will be evident that the color maps 52" and 52'" in FIGS. 3C, 3D call for two different lookup tables where each is constructed in a manner similar to that described above in reference to FIG. 3A. A baseline may also be included in each of FIGS. 3A, 3B, 3D, and any one of the color maps described below, including the mixed mode color maps. To implement the base line region in all such maps, a null color or display feature indicator is stored in the lookup table for each signal whose energy and mean velocity information corresponds to a point in the base line region of the color map. The color maps with baselines are particularly useful for cardiology applications.

Figures 4A, 4B:
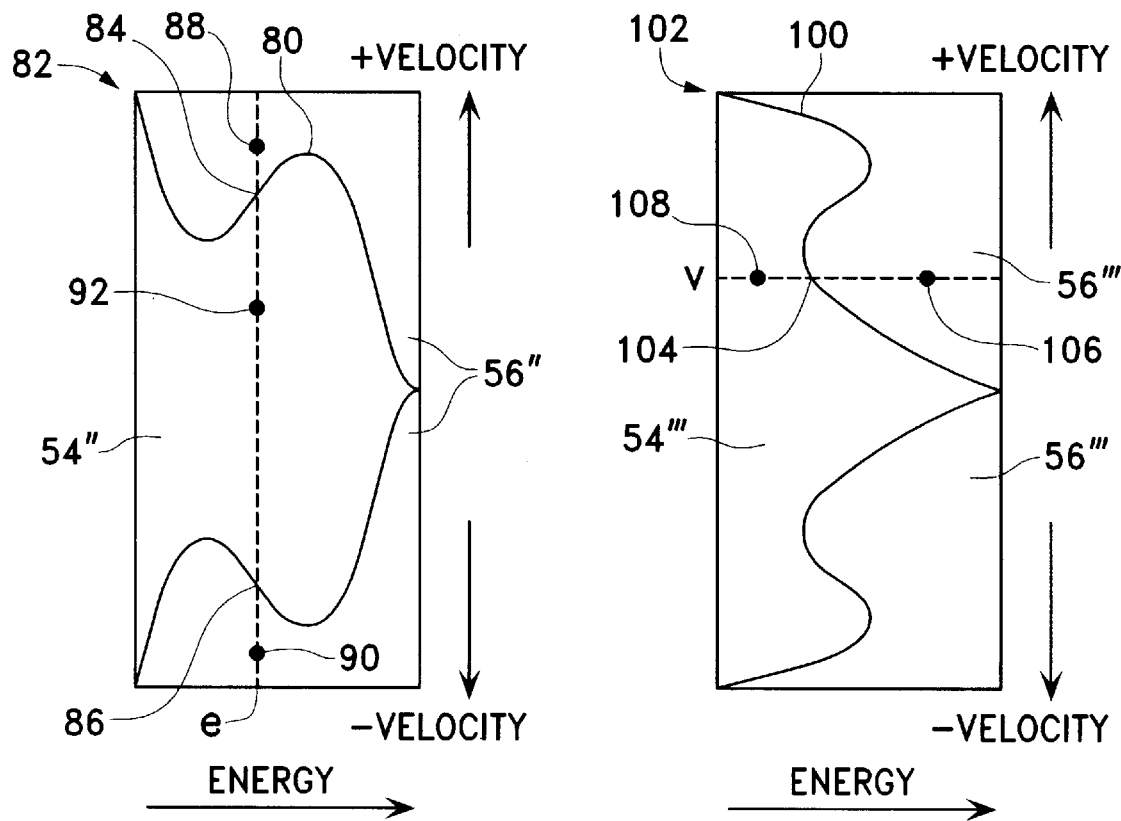
FIGS. 4A, 4B are color maps illustrating the threshold mode of this invention, where the boundary includes curved lines which are single-valued functions of either velocity or energy, but not of both, to illustrate another embodiment of the invention.

In FIGS. 3A–3D, the boundary consists of straight lines. This is not required for the invention, however, and the boundary can take on odd shapes such as those shown in FIGS. 4A, 4B. In FIG. 4A, boundary 80 is a single-valued function of energy, but a multi-valued function of velocity. Boundary 80, as well as the boundaries in FIGS. 3A–3D, consist of a set of pairs of threshold values, each pair including a threshold value for energy and a threshold value for the magnitude of mean velocity. For each input signal to encoder 42 containing the lookup table implementing the color map 82, the energy (e) and velocity information of such signal are matched to the pairs of threshold values of the boundary 80 to find the two pairs (84, 86) of threshold values with the same energy e as that of the information in the signal. The encoder 42 would then compare the magnitude of the mean velocity of the information in such signal to the two threshold pairs 84 and 86 with the same energy value. If the magnitude of the mean velocity of information in such input signal is greater than those in threshold pairs 84, 86, such as at points 88 or 90 in region 56", then a color is selected as a function only of the velocity of the information in such signal. Where the opposite is true, such as at point 92 in region 54", then a color is selected only as a function of the energy of the information in such signal.

In FIG. 4B, boundary 100 is a single-valued function of velocity. Therefore, for an incoming signal containing information that the magnitude of velocity of the fluid flow or tissue motion is v, a pair of threshold value in boundary 100 is located at point 104 that has the same velocity threshold v. If the energy of information in the incoming signal to encoder 42 is greater than the energy of the threshold at 104, such as at point 106, then the incoming signal falls in region 56''' and the color is selected only as a function of velocity of the information in such signal. If the opposite is true such as at point 108, then a color is selected only as a function of the energy of the information in such signal.

Again as a practical matter, in the preferred embodiment, the above-described comparing and selecting process is implemented by constructing a lookup table that accomplishes the above-described functions of the color maps 82, 102, so that no color calculation needs to be performed on the fly. Another implementation can employ a memory storing the threshold pairs of the boundary and a processor or controller for performing the comparison between the signal and threshold pairs and selection of color in response to the result of the comparison.

From the above description, it is evident that irrespective of the shape of the boundary and whether the boundary is a single valued function of energy and/or velocity or not, as a general conception of the threshold mode, a boundary may be provided to divide the two-dimensional color space into two regions, a first region containing the origin where magnitude of velocity and energy are minimum, and a second region. If the magnitude of mean velocity and energy information of incoming signal to encoder 42 falls within the first region, then only the energy information in the signal is taken into account in selecting a color and color selection for signals falling into the second region can vary as described above; this is implemented in a lookup table. Alternatively, instead of defining the two regions by reference to two regions and the origin, it is also possible to formulate an encoding scheme using the method described above in reference to FIGS. 4A, 4B. Where the boundary is a single-valued function of either energy or velocity, it is possible to perform the procedures described in reference to FIGS. 4A, 4B to encode the signal. All such schemes provide the advantages described above for clinicians when imaging low energy perfusion signals.

Figure 5A:
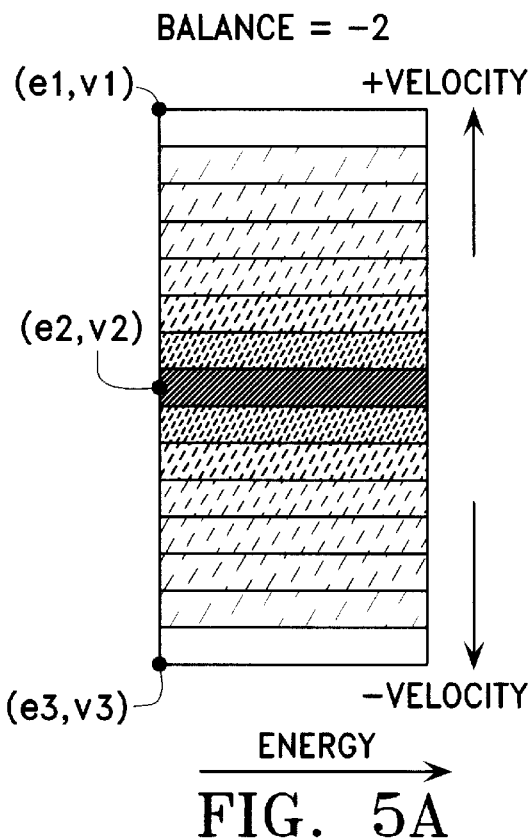
FIGS. 5A–5E are color maps illustrating the different locations of the boundary in the threshold mode at different balance settings to permit the user to emphasize the color dependence on velocity relative to the color dependence on energy in the threshold mode.
Figure 5B:
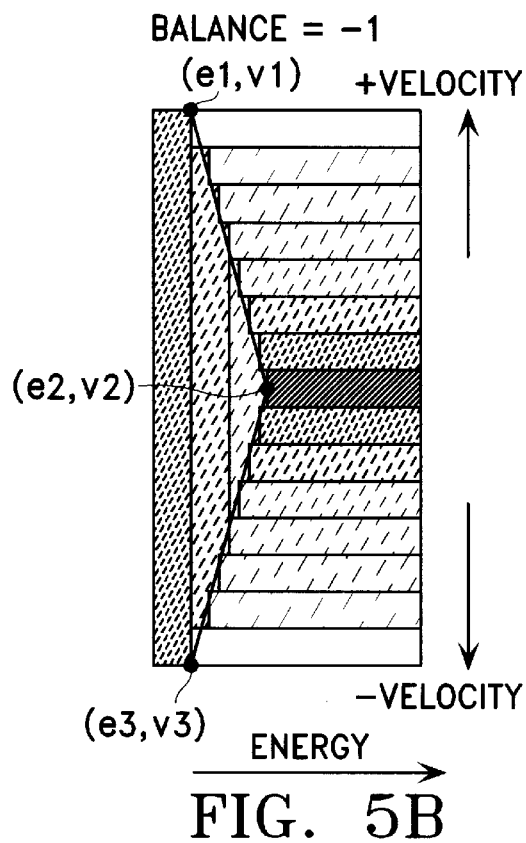
Figure 5C:
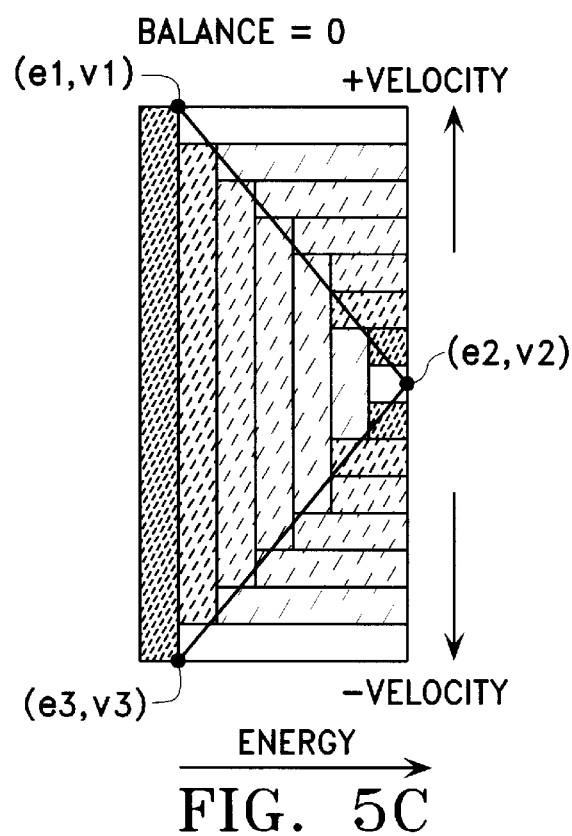

FIGS. 5A–5E are five color maps illustrating the concept of balance as applied to the threshold mode. In particular clinical situations, the velocity content may reveal different information compared to the energy content of the input signal to encoder 42. In such event, it may be desirable to increase the dependence of the color selection on the velocity content of the incoming signal as compared to the dependence on the energy content of said signal, thereby reducing the dependence on the energy content. In the case of the threshold mode, this can be accomplished simply by moving the boundary. Thus, in FIG. 5A which is a color Doppler velocity map same as that used conventionally, only the velocity information is used for selecting a color and the energy information is not used at all. In FIG. 5B, color encoding using only the energy information is used only for signals indicating very low energies while for most of the color map covering a greater part of the dynamic range of energy and the predetermined range for velocity, only the velocity information in the incoming signal is used for color encoding. In FIG. 5C (same as FIG. 3A), the boundary 50 divides the color map 52 into the two regions 54, 56 of approximately equal area, equivalent to an approximately equal emphasis on the energy information and velocity information content of incoming signals.

Figure 5D:
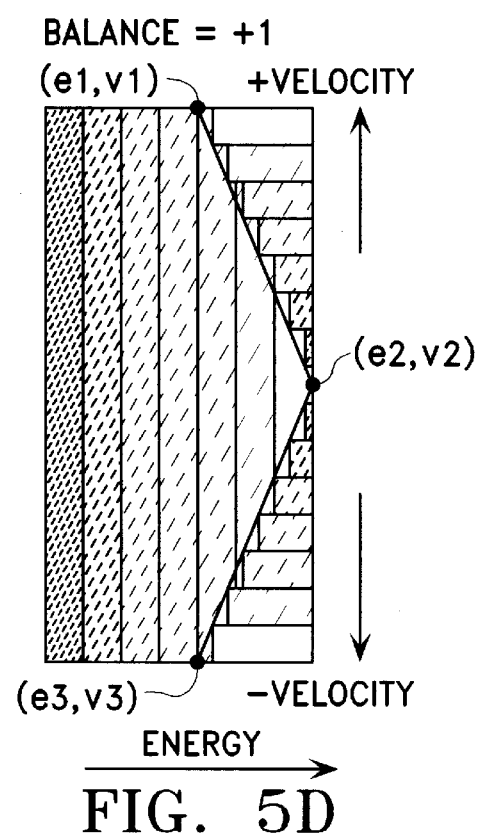
Figure 5E:
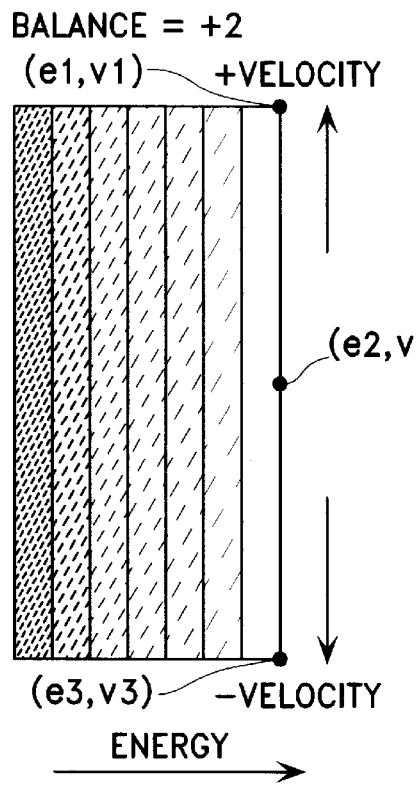

In FIG. 5D, for most of the dynamic range of energy and the range of velocities, only the energy information is used for encoding incoming signals to the encoder. In FIG. 5E, the velocity information in the incoming signal is ignored and only the energy information is used as in conventional color Doppler energy imaging. Thus, five different lookup tables may be provided to implement the color maps of FIGS. 5A–5E. By selecting one of five different balance values, a clinician may choose the lookup table corresponding to any one of the five figures. A default setting for the balance can be zero which results in an approximately equal emphasis on velocity and energy information in FIG. 5C. Thus the values −2, −1, 0, 1, 2 for b may simply be five different values of a user controlled parameter, where the user can select any one of the five lookup tables by selecting one of the five b values, such as by pressing a key on a keyboard (not shown) to cycle through the five values until the desired value is reached to select the corresponding lookup table.

Figure 6A:
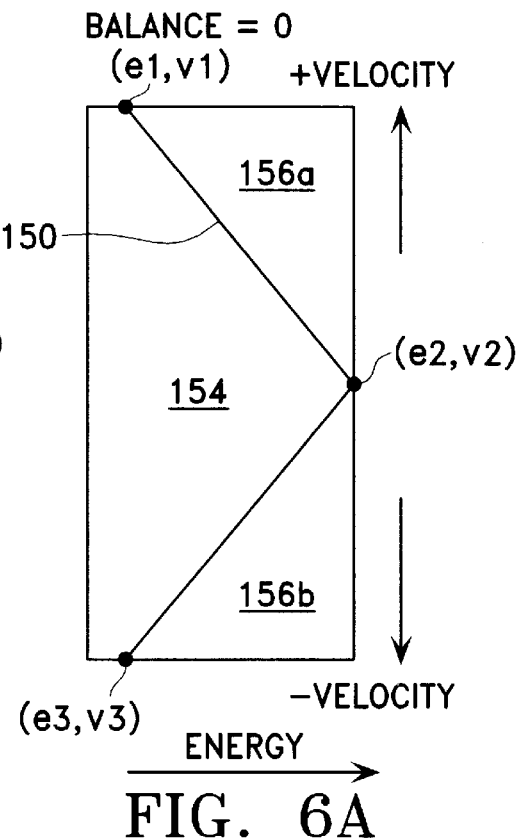
FIGS. 6A–6C are color maps of the type similar to those in FIGS. 5C, 5B and 5D, respectively.
Figure 6B:
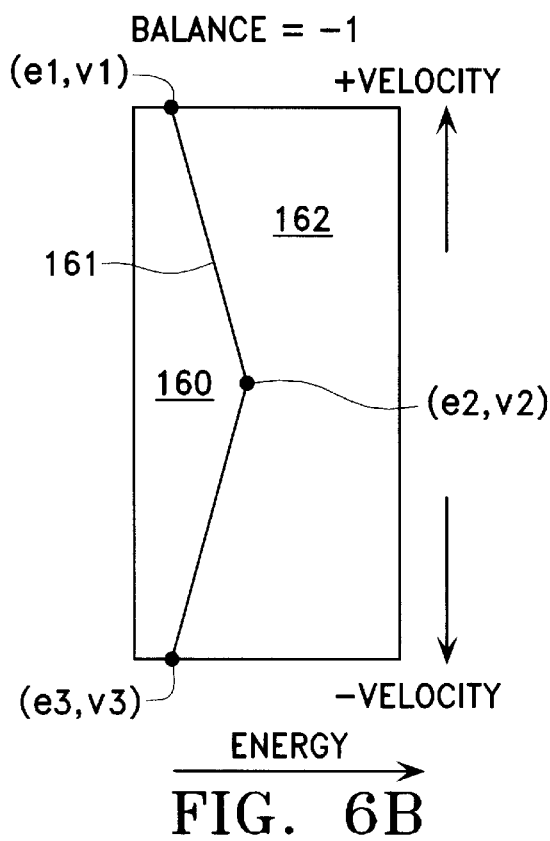
Figure 6C:
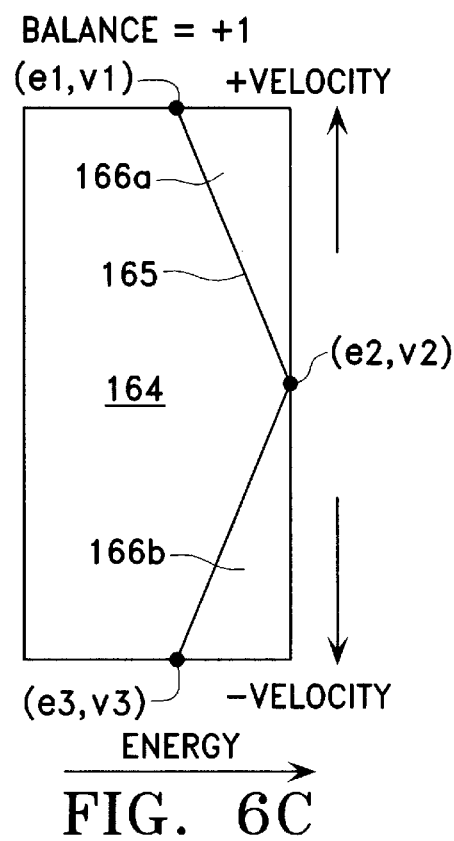

The color maps in FIGS. 6A, 6B, 6C are the same as those in FIGS. 5C, 5B and 5D, respectively, where the color bars have been omitted for simplicity. FIGS. 6A, 6B, 6C are in Cartesian coordinates. FIGS. 7A–7C are color maps in polar coordinates obtained by conformal transformation from FIGS. 6A–6C, respectively, as shown by the arrows 120, 122 and 124 in FIGS. 7A–7C. Thus, boundary 150 in FIG. 6A becomes boundary 150' in FIG. 7A. Similarly, boundary 161 in FIG. 6B becomes boundary 161' in FIG. 7B and boundary 165 in FIG. 6C becomes boundary 165' in FIG. 7C. Region 154 of FIG. 6A is transformed into the area 154' inside the small ellipse 150' in FIG. 7A. The region for positive velocity 156a becomes a shaded region 156a' on the right hand side of vertical axis 130 in FIG. 7A and the unshaded area 156b' of the larger ellipse exclusive of area 154' on the left side of vertical axis 130 is the result of transforming negative velocity region 156b in FIG. 6A. FIGS. 7B, 7C contain similar regions 160', 162', 164', 166a', 166b', which are transformed from corresponding regions 160, 162, 164, 166a, 166b in FIGS. 6B, 6C. In FIGS. 7A–7C, the energy at a point in the map is represented by the distance of the point from origin O and the velocity is represented by the angle of the vector of the point from the vertical axis 130 pointing downwards.

As in the case of Cartesian coordinates, the regions 154', 160', 164' where signals are to be encoded only as a function of the energy information contain the origin O where energy is minimum. Even though the angle at the origin is indeterminate, insofar as these polar coordinate color maps are concerned, the magnitude of velocity is also assumed to be at its minimum at the origin. As a practical matter, for actual signals, the actual velocities at their minimum will be at small non-zero values so that the above-described apparent problem is seldom encountered. It will be noted in FIGS. 7A–7C that the point (e1, v1) and (e3, v3) collapse, graphically illustrating the aliasing problem commonly encountered in ultrasound imaging.

Mixed Display Mode

Figures 8A, 8B, 8C:
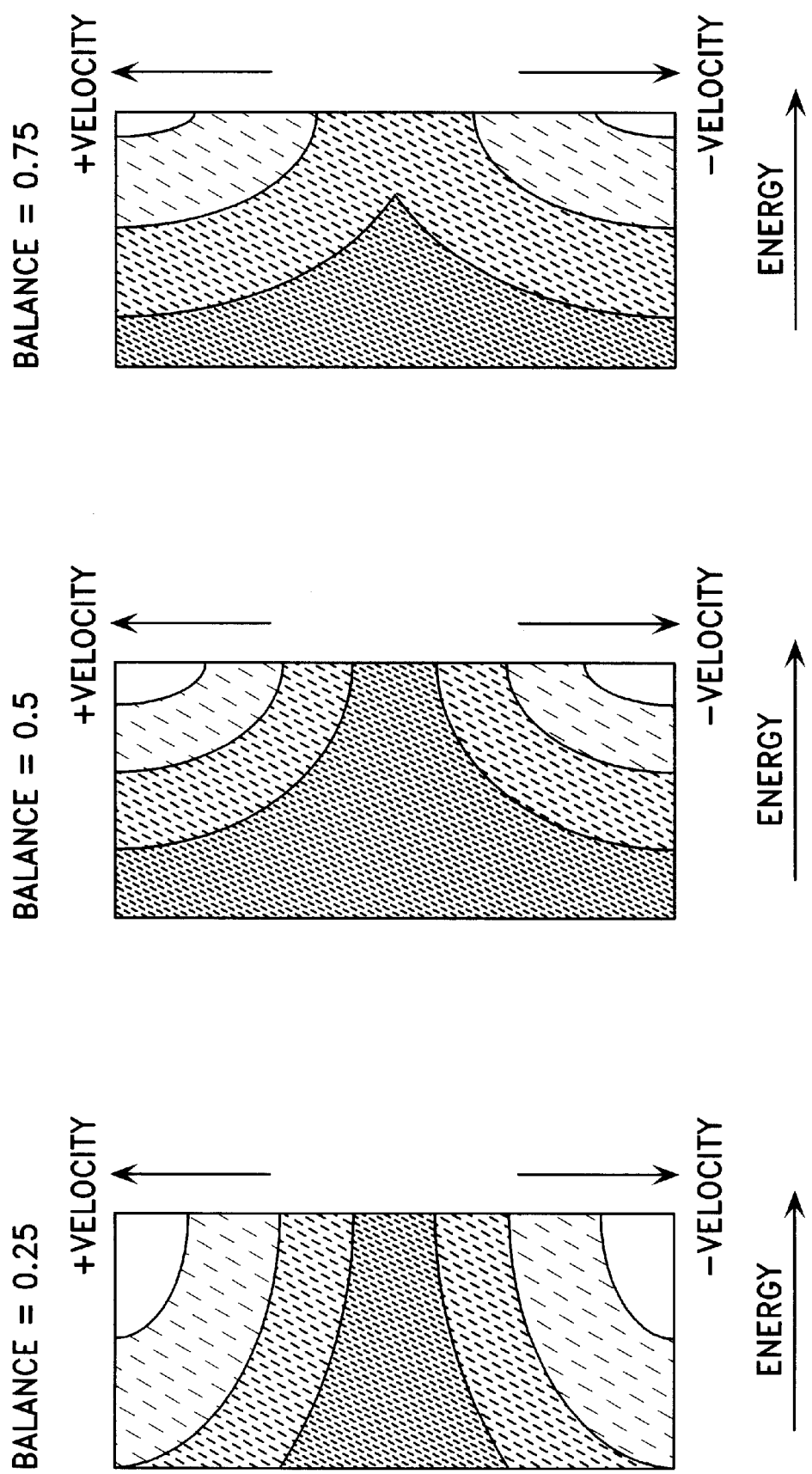
FIGS. 8A–8C are three color maps in Cartesian coordinates illustrating the mixed mode aspect of the invention where three different balance settings are available to the user and where colors are selected as a weighted product function of the energy and magnitude of velocity.

In the threshold mode, an input signal is encoded by encoder 42 either as a function of its energy information or velocity information, but not both, except in the case of FIG. 3D, with or without a baseline. In another aspect of the invention known as the mixed display mode, the color for representing a signal is selected as a function of both its energy and mean velocity. FIGS. 8A–8C are three color maps illustrating the mixed mode where again the areas with curved contours of different shading indicate different values of luminance and/or chrominance, and areas with the same shading exhibit the same values of luminance and/or chrominance. In FIGS. 8A–8C, the color is a weighted product function of energy and magnitude of velocity. In FIG. 8B, the colors selected have an equal dependence on velocity information and energy information. In FIG. 8A, a greater emphasis has been placed on velocity information and less emphasis on energy information, so that the change in color in the display on the monitor 46 will be more sensitive to change in magnitude of velocity of the fluid flow or tissue motion in the echo received by receiver 30 and less sensitive to the energy of such flow or motion. In FIG. 8C, the opposite is true where the color displayed is more sensitive to change in energy and less sensitive to change in magnitude of velocity. The two extreme cases are where the color displayed is sensitive only to change in energy or to change in magnitude of velocity, but not to both, in which cases the color maps would be the same as those in FIGS. 1A, 1B. Again, the color mapping in FIG. 8B may be selected as the default setting.

FIGS. 9A–9C are three color maps illustrating the mixed mode where the color is an elliptical function of energy and magnitude of velocity. In FIG. 9B, the colors selected have an equal dependence on velocity information and energy information. In FIG. 9A, a greater emphasis has been placed on velocity information and less emphasis on energy information. In FIG. 9C, a greater emphasis is placed on energy information and less emphasis on velocity information. Again, the two extreme cases would be the same as the color maps in FIGS. 1A, 1B.

FIG. 10 is a color map illustrating the mixed mode where the color is a linear combination of energy information and velocity information, where there is an equal emphasis on the two types of information. If one were to increase the emphasis on energy information at the expense of velocity information, one way is to retain point 202 at its present location and to render the lines of equal color steeper such that the line 202–204, for example, is moved to the new position 202–204', and the line 202–206 is moved to the new position 202–206' shown in dotted lines. If the dependence on velocity is emphasized at the expense of dependence on energy, one method is to move line 202–204' to the left and line 202–206' to the left until points 204', 206' are much closer to points 204, 206, respectively, or may even overlap at or go beyond such points, and the new location for point 202 is also displaced to the left relative to its original location shown in FIG. 10. The other lines of equal color will be caused to move in a similar manner.

In general, in the mixed mode, a color is selected as a function of both energy and mean velocity as opposed to the threshold mode, where except for the case in FIG. 3D with or without a baseline, the color is selected as a function only of energy or mean velocity, but not both. An example of such generalized mixed mode map is illustrated in FIG. 11A. As shown in FIG. 11A, which is a two-dimensional velocity and energy color map, region 220 includes the origin 60 where magnitude of mean velocity and energy are at their minima, so that region 220 includes the colors that correspond to low energy and low velocity information in the signals. It will be useful to color encode signals in this region as a function of both energy and velocity, even if the remaining region 222 is encoded only as a function of mean velocity or energy, but not both velocity and energy. A further refinement of the generalized concept of the mixed mode is illustrated in FIG. 11B.

For the purpose of illustration, the color map in FIG. 11B is assumed to be normalized so that the mean velocity would range from 0 to 1 for positive flows and 0 to −1 for negative flows and energy would also range from 0 to 1. Semicircle 230 has a radius of ½, so that the region enclosed by the semicircle therefore includes a portion of the low energy and low mean velocity domain, similar to region 220 of FIG. 11A. However, one can choose only a portion of the region, where in this portion only is color to be selected as a function of both energy and mean velocity. Thus, one may choose a portion of the region, such as the shaded portion 232; it is only within such portion that incoming signals to the encoder are color-encoded as a function of both energy and mean velocity whereas at or near the origin 60 outside the portion 232, the incoming signals are color-encoded as a function of only energy or mean velocity, but not both. The region enclosed by semicircle 230 covers the lower half of the range of values for positive and negative mean velocities and the lower half of the values of the dynamic range of the energy in the energy-velocity domain. Therefore, portion 232 is chosen from the lower half of the range of mean velocities and the lower half of the dynamic range of energy. Obviously, portion 232 may be chosen from low mean velocity and low energy regions covering other than the lower half of the mean velocity range and the lower half of the energy dynamic range; such features are within the scope of the invention. An example would be the regions within semicircles 240, 250 covering, respectively, the lower third and the lower two-thirds of the mean velocity range and energy dynamic range.

Of course, it may be desirable for portion 232 to encompass the entire color map in many applications so that any incoming signal to encoder 42 will be color-encoded using both the energy and mean velocity information of the incoming signal.

An alternative general formulation for the mixed mode format may be defined by the following equations:

$$Y = F(b, e, v);$$

where F should increase as e and v;

$$Z = G(\text{sign}(v)) * H(e, \text{abs}(v), b);$$

where F, G, H are functions, v the mean velocity, e the energy, "abs" means "the absolute value of", "sign" means "the sign of" and b a user-selectable constant. It may be important, as a practical matter, to choose functions F, G and H that result in colors that are compatible with capability of the ultrasound color display system. The color bars associated with the mixed mode algorithm above can be depicted in any two-dimensional coordinate systems, in particular the Cartesian and polar coordinates.

In the Cartesian coordinates, energy e and velocity v are represented by x and y, respectively:

$$e=x; \ 0 \leq x \leq 1;$$

$$v=y; \ -1 \leq y \leq 1;$$

In the polar coordinates, energy is represented by a generalized radius R;

$$e=R;$$

$$R^2=(x/a)^2+(y/d)^2; 0 \leq R \leq 1;$$

where a and d are constants that define an ellipse. The velocity is represented by an angle such that:
1. the left and right half represents the negative and positive velocities, respectively;
2. the zero velocity is represented by lower half of the y axis ($\theta=-\pi/2$ or $3\pi/2$); and
3. the positive and negative maximum velocity is represented by upper half of the y axis ($\theta=\pi/2$), where potential aliasing takes place.

The color maps in FIGS. 8A–8C, 9A–9C and 10 are in Cartesian coordinates. FIGS. 12A–12C are polar coordinate color maps equivalent to and transformed by conformal transformation from FIGS. 8A–8C. FIGS. 13A–13C are polar coordinate equivalents and transformed by conformal transformations from FIGS. 9A–9C. FIG. 14B is a polar coordinate color map equivalent to FIG. 10 and transformed therefrom by conformal transformation. As discussed above, the (equal color) contours in FIG. 10 will change depending on the balance value chosen. FIG. 10 shows the case where equal emphasis is placed on velocity and energy. FIG. 14A is a polar coordinate color map where dependence on velocity is emphasized over dependence on energy whereas in FIG. 14C, dependence on energy is emphasized over the dependence on velocity.

The two-dimensional mixed energy-velocity color lookup tables are generated by the algorithm described below:
(1) Create a one-dimensional velocity color lookup table by either one of the following scenarios.
A. Many existing ultrasound display systems already include one-dimensional velocity color lookup tables. Start out with a known one-dimensional velocity color lookup table (such as FIG. 1A) which is described by the RGB (red, green, blue) values. The RGB values are then transformed into YUV parameters by the matrix transformation:

$$\begin{bmatrix} Y \\ U \\ V \end{bmatrix} = \begin{bmatrix} 0.299 & 0.587 & 0.114 \\ 0.701 & -.587 & -.114 \\ -.299 & -.587 & 0.886 \end{bmatrix} * \begin{bmatrix} R \\ G \\ B \end{bmatrix}$$

B. Simply create a one-dimensional velocity color lookup table by the following scheme in the YUV space:

$$Yv=f(abs(v))$$

which increases when abs(v) increases;

$$Zv=g(sign(v))*h(abs(v));$$

where Z is a complex variable combining both the U and V;

$$Z=V+i*U;$$

and v is the velocity. The basic idea behind a one-dimensional velocity color lookup table is: A. to have two colors correspond to the directional nature of the velocity signal; and B. the brightness (luminance) increases as the absolute velocity. For convenience, we make the following convention in our notations:

v: normalized velocity signal, $-1 \leq v \leq +1$;

e: normalized energy signal, $0 \leq e \leq 1$;

RGB: normalized RGB values, between 0 and 1;

Y: normalized luminance; $0 \leq Y \leq 1$;.

Some typical examples are:

Zv=constant1; for $v \geq 0$ and

Zv=constant2; for v<0;

where complex constant1 and constant2 determine the colors; and $$Yv=(abs(v))^m;$$

where m>0; or $$Yv=\{1+tanh[2n*(abs(v)-\frac{1}{2})]/tanh(n)\}/2;$$

or $$Yv=\{1+tan^{-1}[2n*(abs(v)-\frac{1}{2})]/tan^{-1}(n)\}/2$$

where n is positive in the above two equations for Yv;
(2) Use the velocity color lookup table as the starting energy color lookup table:

for $v \geq 0$, Ye=Yv; Ze=Zv;

for v<0, Ye=Yv; Ze=Zv;

(3) Combine the energy and velocity in YUV space to create a two-dimensional color lookup table family defined by the balance parameter b:

$$Y=F(Ye,Yv,b);$$

where F should increase as Ye and Yv;

$$Z=G(Ze,Zv,b)$$

$$0 \leq b \leq 1$$

Typical examples are:

$$Z=b*Ze+(1-b)*Zv;$$

or $$Z=(Ze+Zv)/2;$$

and $$Y=(b*Ye^n+(1-b)*Yv^n)^{1/m}; \ n,m=1,2,3,$$

or $$Y=Ye^{b}*Yv^{(1-b)}$$

By insisting functions f and F being monotonically increasing, the resulting color lookup table will guarantee the higher perceived brightness for stronger energy or velocity signal. The texture of the color map can be controlled through the selection of f and F. This feature can be used in cardiology application to control the vibrance of the jet presentation.

Of course, those skilled in the art will understand that the present invention is not limited to closed-form solutions, such as those given above. In practice, imaging frequently relies on trial and error or "heuristic" techniques.

Accordingly, display colors as a function of energy and velocity may be selected by trial and error, based upon which colors look appealing and are easily distinguishable by the human eye.

In the above description, Y is the luminance and U, V are the chrominance variables of a YUV color space equivalent to RGB color space normally employed in ultrasound display systems. It is desirable to perform the color mapping function onto energy-velocity domain using YUV parameters instead of RGB values since, in YUV space, one can easily ensure that the overall luminance increases with the magnitude of mean velocity or with energy, or with both. By displaying the luminance that increases monotonically with energy, magnitude of mean velocity, or both, it is easier for the clinician to identify significant physiological events and to be less likely to reach the wrong diagnosis. For example, even for signals containing information indicating low velocity blood flow, if the blood flow nevertheless indicates high energy, it will be desirable to emphasize the event and display the event on the color monitor 46. This, for example, may be the case in cardiology, or venous flows. Displaying a color whose luminance is a monotonically increasing function of energy will ensure that such flows will be prominently displayed.

A particularly useful mixed mode method function is where luminance is a function of the product of the magnitude of mean velocity and energy of information in the incoming signal. In such event, an indication of volumetric flow can be ascertained directly from the luminance of the color displayed.

The predetermined range of the magnitude of mean velocity may be 0 to at least 6 meters per second; more typical desirable ranges of the magnitude of mean velocity may range from 0 to about 10 meters per second. The dynamic range of energy is from a system noise level to at least 10 dB above such level and preferably, from the system noise level to at least 20 dB or above, above such level.

In the mixed mode display format, it is preferable for the mapping function to be continuous. However, since many ultrasound display systems are digital, discretization or quantization effects are inevitable, so that it will be desirable for the mapping function to be substantially continuous, or continuous given the limit of quantization. It is also preferable for the resolution to be such that the range of mean velocities and the dynamic range of the energy change by less than one-eighth of their predetermined ranges, and the color changes by less than one-sixteenth of its range. In one embodiment, six bits are used for conveying velocity information and eight bits for color, so that, in such scheme, the signals will change by 1/64 of their dynamic range, and color will change by 1/256 of its range.

From the mixed mode display format equations referenced above, it will be evident that the relative emphasis between the color dependence on energy and color dependence on mean velocity may be altered by changing the user controllable variable b. In the above equations, b is normalized to range from 0 to 1. Thus FIGS. 8A, 9A, 12A, 13A, 14A correspond to the case where b has the value 0.25. FIGS. 8B, 9B, 12B, 13B, 14B and 10 correspond to the value of b=0.5. FIGS. 8C, 9C, 12C, 13C and 14C are the result of b=0.75.

The weighted product function illustrated in FIGS. 8A, 8C may be based on the following equation:

$$Y = Y_e^b * Y_v^{(1-b)};$$

The elliptical mapping function of FIGS. 9A–9C may be based on the following equation where both m and n have the value 2:

$$Y = \{b*Y_e^n + (1-b)*Y_v^n\}^{1/m}; n, m=1,2,3,$$

FIG. 10 is an illustration of the linear function in the following relation:

$$Y = (Y_e + Y_v)/2;$$

Overall System

Figure 15:
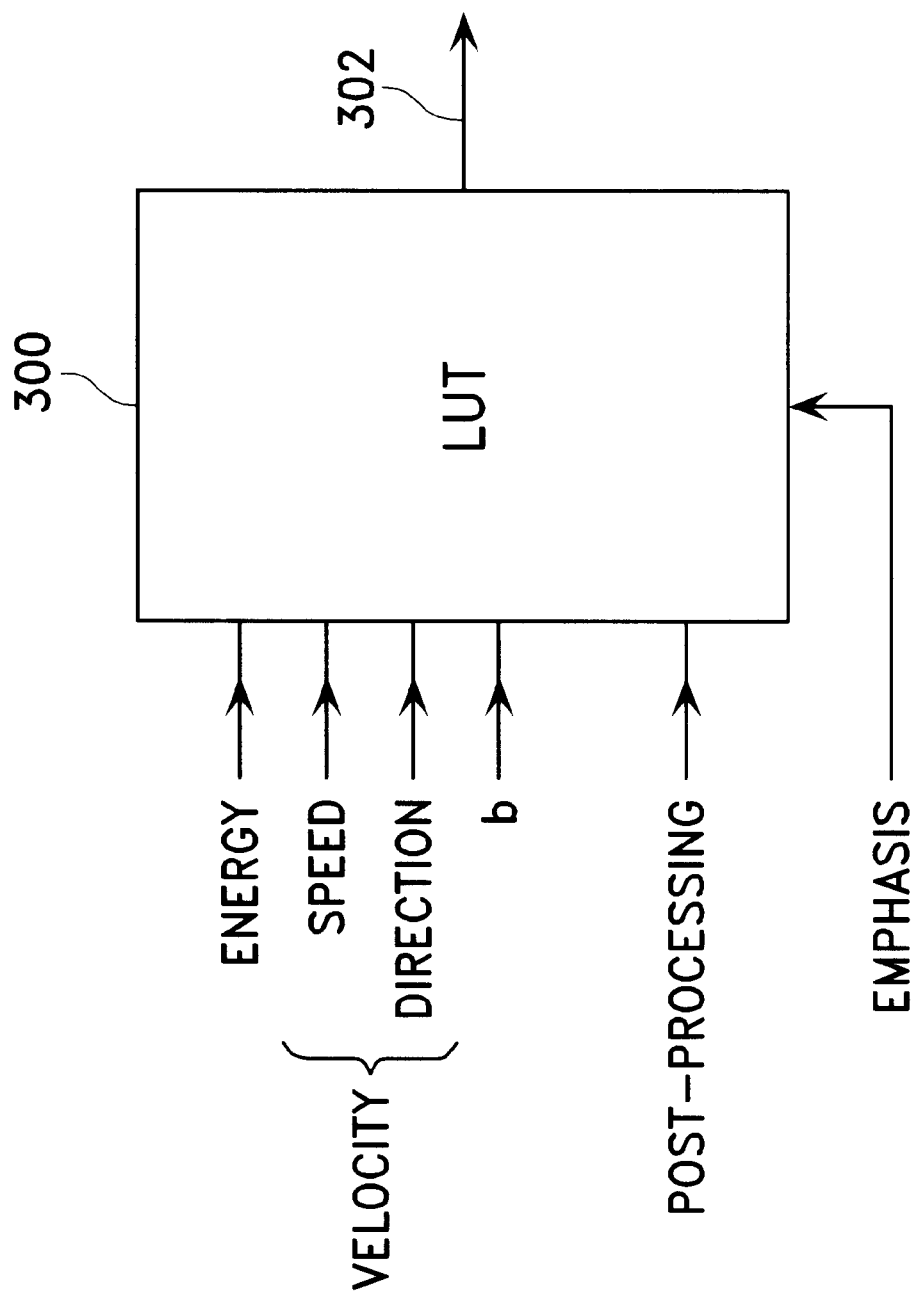
FIG. 15 is a block diagram of the color encoder of FIG. 2 to illustrate the preferred embodiment of the invention.

FIG. 15 is a block diagram of a lookup table in the color encoder 42 of FIG. 2 to illustrate the preferred embodiment of the invention. As shown in FIG. 15, the energy and mean velocity in the information contained in the incoming signal to the encoder are supplied to lookup table 300.

The user may select the desired mode for color mapping from one of two modes: threshold display mode or mixed display mode. It is also possible to have the hybrid mode such as that in FIG. 3D with or without a baseline, where part of the color part is threshold mode and part of the color map is mixed mode format. After choosing the desired mode, user then selects the desired colors for display. The user may also choose to display directional information for the fluid flow or tissue motion, by choosing different colors for positive and negative velocity, or such information can be ignored by choosing the same color for positive and negative velocities. Such choices can be accomplished by a post-processing key or input shown in FIG. 15.

In addition, the user selected value of b is also inputted to the lookup table to select a desired mapping function after the user has selected a display mode as described above. Such input may conveniently be implemented by the key of a keyboard whereas the user may cycle through the above-described five or more values of b to select one of five or more different mapping functions of the same display mode but different b values contained in five or more different lookup tables within block 300 for the particular display mode already selected. Of course, fewer lookup tables than five (e.g. two) may be used and are within the scope of the invention. The energy and mean velocity inputs are then used to select the proper color from the selected color lookup table and the color is supplied at the color output 302 which supplies such signal to the scan converter 44. The user selectable lookup tables are all pre-computed and stored in block 300.

"Balance" Control

One purpose of the color Doppler energy and velocity mode (CEV) is to provide simultaneous velocity and energy information of a received Doppler signal; furthermore, a clinical user should be able to optimize his image acquisitions by emphasizing either the energy content or the velocity content of the image display if desired. For example, the velocity content in CEV mode may be preferred in carotid imaging while its energy content may be more emphasized for thyroid perfusion imaging. In diagnosing liver cirrhosis, a clinician may prefer to emphasize energy imaging initially in order to observe liver perfusion and then switch to velocity imaging for directional blood flow information. The "balance" control allows a clinical user to optimize the CEV mode in a clinical environment.

Currently, there are five balance control settings, ranging from balance=−2 for high emphasis on velocity imaging to balance=+2 for high emphasis on energy imaging. Balance=0 is our default imaging format which is believed to provide the optimal balance between energy and velocity imaging for many typical clinical applications.

It is clear that the number of balance control settings may be increased to provide a more continuous choice of imaging formats ranging from velocity imaging to energy imaging. Traditionally, we have only a few color Doppler imaging modes as outlined in the section describing conventional methods. The two most commonly used modes are the color Doppler velocity and the color Doppler energy modes. The CEV mode has effectively provided many more color Doppler imaging modes in which the user can select the most appropriate imaging mode in a particular clinical application through the use of the "balance" control.

Balance control in either mixed or threshold modes allows the user to ignore the magnitude of the mean velocity in order to display energy alone or energy and direction. Because velocity is a vector comprising speed (magnitude) and direction (sign), the mixed and threshold CEV modes can display three items of information: energy, speed and direction. Sometimes the combined color presentation of these three quantities can be difficult for the viewer to interpret.

Figure 16:
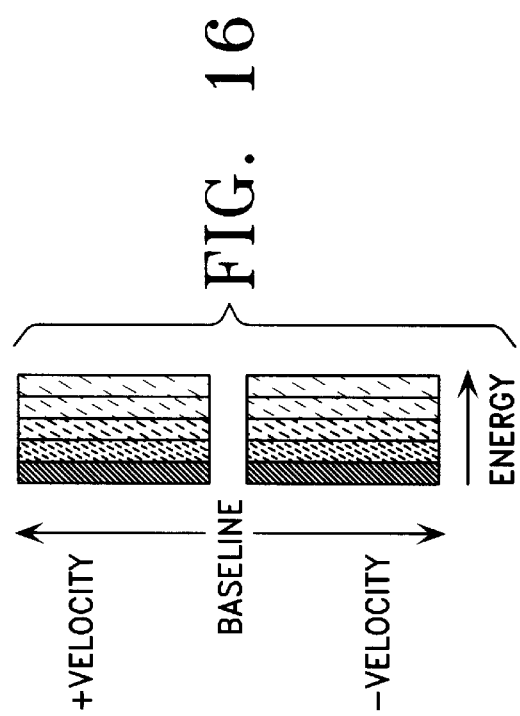
FIG. 16 is a color map illustrating the directional energy mode of the invention.

To simplify the presentation of information, the user can adjust the balance so that the color displayed is no longer sensitive to speed, yet still sensitive to direction, as shown in FIG. 16. For example, FIGS. 8 and 9 illustrate mixed mode color maps. As described previously, the user can set the balance so that the display is insensitive to magnitude of velocity in order to obtain, e.g., FIG. 1B. Also, as described above, the user may choose different colors for positive and negative velocities of fluid flow or tissue motion.

As a result of these settings, the energy in one direction is displayed with one set of colors, whereas the energy in the other direction is displayed with another set of colors. This type of display is useful for distinguishing between arterial and venous blood flows, and is more easily grasped by the user intuitively because the displayed color mix is less complex.

As an example in threshold mode, FIG. 3D illustrates a threshold map where colors in the region 56' are a function of both velocity and energy information. As in FIG. 3A, the direction of tissue motion or fluid flow in the map of FIG. 3D can be indicated by different colors, such as red for positive velocities and blue for negative velocities.

Further, if the balance is set to b=−2 as in FIG. 5A, the two angled threshold boundaries move to the far left of the map to become a single straight vertical line. However, unlike the maps of FIG. 5, the region 56' to the right of the threshold does not comprise only horizontal velocity bands, but rather mixed energy-velocity bands having a slope. As a result of setting an extreme balance, only the mixed energy-velocity region 56' is displayed. The slope of the energy-velocity bands in region 56' follow the contour of the threshold boundaries so that the bands also become straight vertical lines. The result is a color map of vertical energy bands that retain the color information indicating direction, but lose the information indicating magnitude of the velocity.

Refer back to an exemplary set of equations used to describe the relationship of luminance Y and chrominance Z to energy e and velocity v:

$$Y = F(b, e, v)$$

$$Z = G(\text{sign}(v)) * H(e, \text{abs}(v), b)$$

If the balance b is set to ignore speed but not direction, $$Y = F(\text{sign}(v), e)$$

$$Z = G(\text{sign}(v)) * H(e)$$

or, more generally, $$Y = F(\text{sign}(v), e)$$

$$Z = G_1(\text{sign}(v), e)$$

where the function G is one implementation of a function $G_1$.

The reduced equations illustrate the concept of directional energy mode, which is actually a sub-mode of the mixed and threshold modes. For example, the system may display motion in the positive direction (regardless of speed) in red, where the brightness (luminance) of red varies as a function of energy in the positive direction. Motion in the negative direction may be displayed in blue, where the brightness of blue varies with energy in the negative direction. Low energy values in either direction may be encoded with lower luminance values, as one example. FIG. 16 illustrates a resulting exemplary color map.

In the foregoing example, the luminance values must span a wide range so that the luminance is very low for low-energy signals and very high for high energy signals. This range is necessary to achieve the high contrast necessary for the viewer to distinguish energy values. However, if only one color (red or blue) is used in each direction, that color will tend to appear washed out at high luminance. For example, red appears as a pale pink, which is unpleasant to the viewer and difficult to distinguish.

Accordingly, the present invention also varies the chrominance Z as a function of energy. For example, the designer may encode red at low to mid-range luminances to correspond to low to mid-range energy levels in the positive direction. For high energy levels, however, the designer may choose a high luminance color with different chrominance, such as gold, which is pleasant to the eye and easily distinguishable. In the negative direction, the designer might encode low to high-energy levels with colors ranging from dark blue to light blue to green.

As described previously, the color maps may be determined through trial and error techniques. This is especially easy for directional energy mode, in which the designer need only select chrominances and luminances as a function of energy in each direction. For example, in each direction, the designer may select 32 different colors (chrominance/luminance combinations) to correspond to 32 energy levels spread uniformly across the range of energies, and then interpolate the color (chrominance/luminance) values for the other energy levels across the continuum using well-known interpolation techniques.

Emphasis Control

In a mode where darker colors encode low-energy signals, the human eye will have difficulty distinguishing among different low-energy signals. In some instances, the user may wish to emphasize low-energy signals, such as slow capillary blood flow. In order to do so, the present invention includes an emphasis control for varying the distinguishability of low or high-energy signals. When the user selects a low emphasis setting, the high-energy signals are color coded with an easily distinguishable, bright color, such as gold, whereas the low-energy signals are encoded with less distinguishable colors.

Conversely, when the user selects a high emphasis setting, the lower energy signals are enhanced as well. This may be achieved by extending the bright color into lower energy regions by reducing the luminance of the highest energy color as it extends into lower energy regions. Alternatively, the system may map different easily distinguishable colors (i.e., map easily distinguishable chrominance/luminance combinations) into the lower energy regions by varying both chrominance and luminance.

According to prior techniques, distinctiveness of the lower energy signals are enhanced by increasing the color gain during signal acquisition, which also increases color noise in the image. The present invention, however, employs a post-processing function that does not introduce color noise. Emphasis control may be achieved by using a different mapping function (color map) for each emphasis setting. Thus, referring to FIG. 15, when the user selects a different emphasis, the system selects a different color map in much the same way a different look up table is selected for each balance setting.

Figure 17:
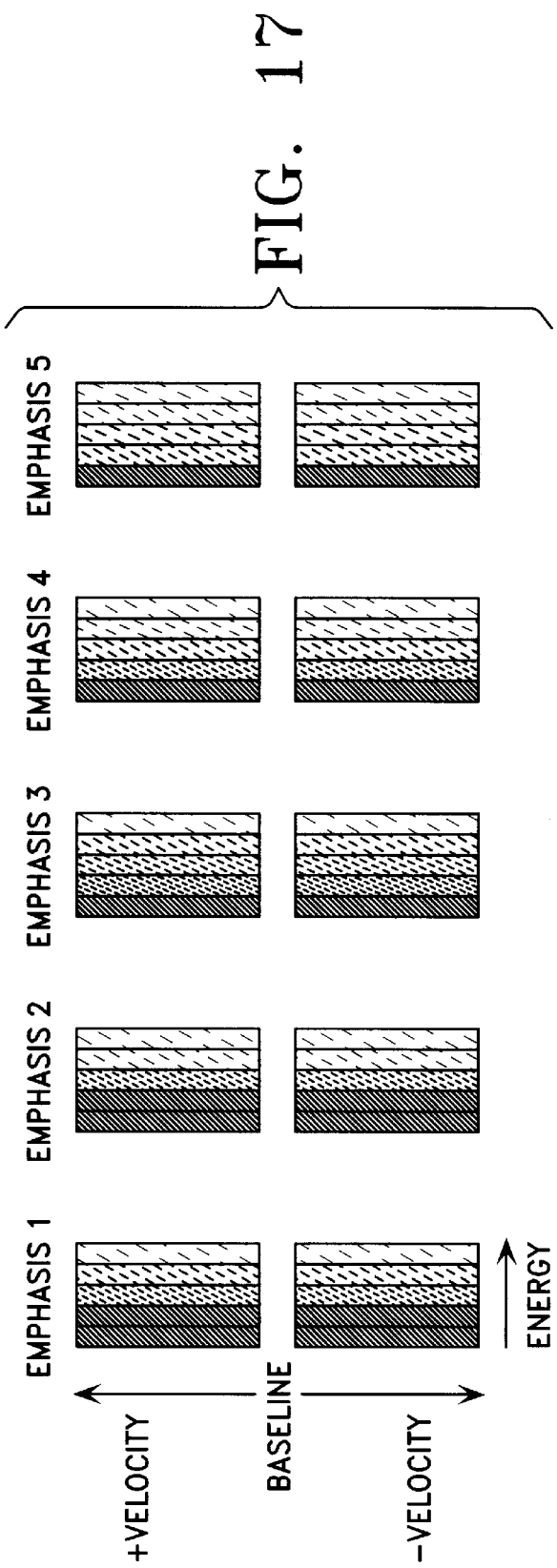
FIG. 17 illustrates color maps for five emphasis settings in directional energy mode.

FIG. 17 illustrates five different color maps for five emphasis settings in directional energy mode, as an example. The distinctiveness of the low-energy color bands increases as emphasis is increased from 1 to 5. Similarly, FIG. 18 illustrates RGB look up tables for five different emphases in directional energy mode. Each value in a table represents the RGB value assigned to a particular energy level. The RGB values are quantized into 256 voltages (00-FF hexadecimal) over the voltage ranges of each of the RGB color guns. The RGB values are used to represent 32 energy levels in the look up tables. The energy levels may be interpolated to obtain a finer granularity of energy levels, e.g., 64 energy levels. Those skilled in the art will recognize that the emphasis control feature is applicable to all the modes described herein.

Alternative Embodiment Using Two One-Dimensional Color Maps

Figures 1A, 1B:
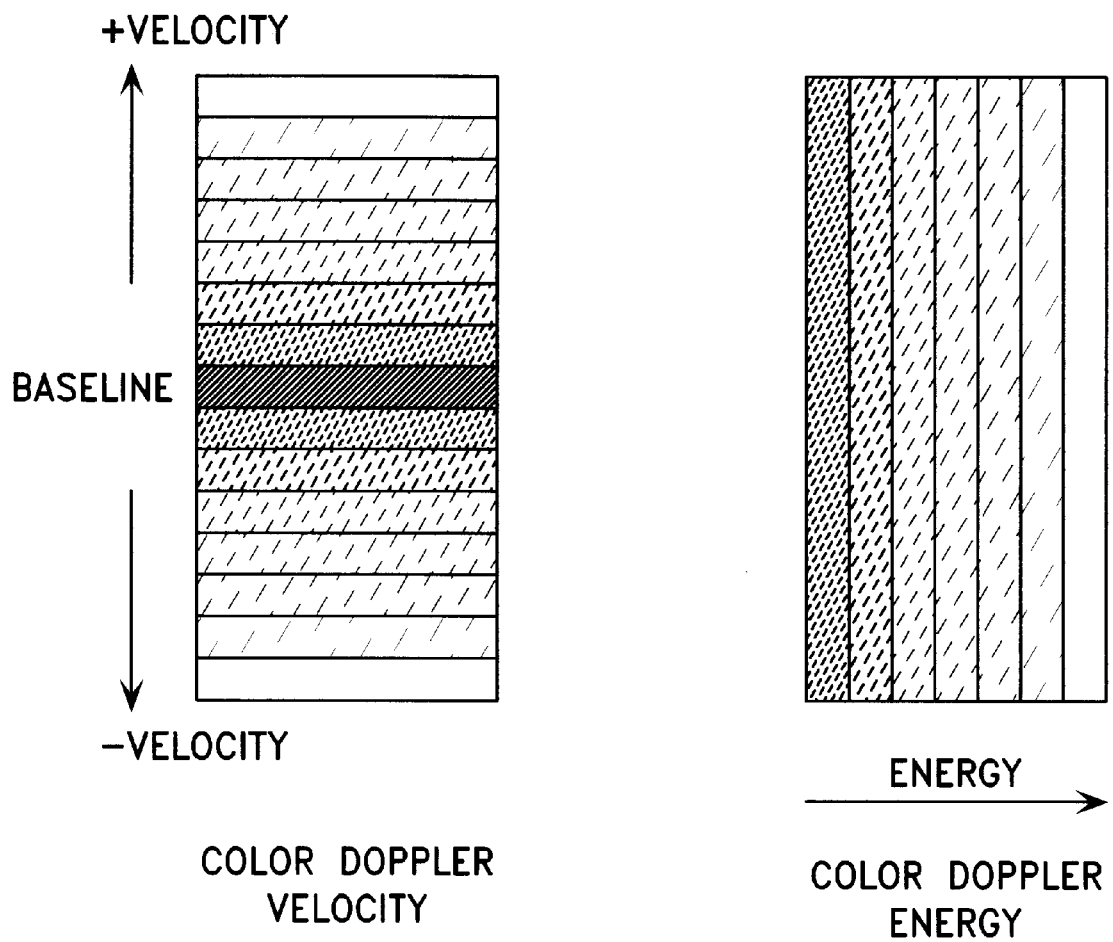
FIG. 1A is a typical color map (i.e., color contour map) which is used in conventional ultrasound systems to show flow velocities and directions.
FIG. 1B is a typical color map used in conventional ultrasound systems for energy imaging in which only the energy component is color-coded.

Two one-dimensional color maps, such as those in FIGS. 1A, 1B may also be used to display both the velocity and energy information of signals. In such scheme, a first color is selected from the mean velocity information using the velocity map in FIG. 1A, and a second different color is selected from the map in FIG. 1B from the energy information. Then both colors are displayed at the same pixel so that the observer would see a blend of the two colors at the pixel.

Advantages of this Invention Over What Has Been Done Before

1. The color Doppler energy and velocity (CEV) mode provides a clinical user simultaneous energy and velocity information of the received Doppler signal and displays the information in a clinically significant and useful way.

2. The invention provides a "Balance" control for a user to emphasize either energy imaging or velocity imaging if desired.

3. In addition to the commonly used color Doppler velocity mode and color Doppler energy mode, the "Balance" control provides many intermediate imaging modes which inherit the benefits and characteristics of the two common color Doppler modes. These intermediate imaging modes can be easily selected to optimize image acquisition during a clinical examination; thus, they may greatly enhance the clinical performance and diagnosis of a color Doppler system.

4. The CEV mode provides enhanced sensitivity compared to the conventional color Doppler velocity mode by providing the energy information along with the velocity information.

5. This invention enhances the color Doppler energy mode by providing directional flow information.

6. The presence of simultaneous energy and velocity information of the received Doppler signal in one image gives a clinician a better physiological representation of the actual flow than either color Doppler energy or velocity alone. For example, in cardiology applications, it is important to detect pathologic jets of blood flow in the heart. The severity (and significance) of these jets increases with both higher velocity jets and more blood in the jet (i.e., higher energy). The combination of both energy and velocity in determining the display of the jet will tend to highlight those jets that are most significant.

7. The enhanced sensitivity coupled with directional flow information of CEV mode provides better diagnostic value in situations where both organ perfusion and directional flow information are essential (e.g., liver cirrhosis).

8. The enhanced sensitivity coupled with directional flow information of CEV mode provides better regurgitant jet visualization, chamber fill-in and flow pattern representation in cardiac imaging.

While the invention has been described above by reference to various embodiments, it will be understood that various changes may be made without departing from the scope of the invention which is to be limited only by the appended claims. For example, even though color mapping as function of energy and velocity is disclosed, it will be understood that other types of display features other than color such as display symbols may be selected as functions of energy and velocity as well; all such variations are within the scope of the invention.

What is claimed is:

1. A method for displaying information comprising the steps of:

supplying a plurality of signals containing information, said information including mean velocity and energy of fluid flow or tissue motion;

providing a boundary in a two variable two-dimensional display feature space, said variables being a mean velocity related parameter and an energy related parameter, each of the energy related parameter and the magnitude of mean velocity related parameter having a minimum value at a point defining an origin in the space, said boundary dividing said space into at least a first and a second region, said first region containing the origin;

obtaining for each signal a display feature that is a function only of the energy related parameter when the energy related parameter and mean velocity related parameter of the information in such signal correspond to a point in the first region; and displaying said display feature for each signal on a display medium.

2. The method of claim 1, wherein said obtaining step obtains for each signal a display feature that is a function only of the mean velocity related parameter when the energy related parameter and mean velocity related parameter of the information in such signal correspond to a point in the second region.

3. The method of claim 1, wherein said obtaining step obtains for each signal a display feature that is a function of both the energy related parameter and the mean velocity related parameter when the energy related and mean velocity related parameters of the information in such signal correspond to a point in the second region.

4. The method of claim 1, said display feature being color, wherein said obtaining step performs a filtering process in a transition area including said boundary to achieve a smoother color.

5. The method of claim 4, wherein said filtering process includes the following steps:

generating a lookup table based on the boundary provided;

defining a transition zone including the boundary; and for each signal corresponding to a point in the transition zone, averaging color values at such point in the table with color values at neighboring points in the table to obtain a filtered color value for the display feature at such point.

6. The method of claim 1, further comprising altering the boundary prior to the obtaining and displaying steps.

7. The method of claim 1, said display feature being color, wherein said obtaining step includes selecting a color for signals of positive mean velocities that is different from a color for signals of negative mean velocities.

8. The method of claim 1, said display feature being color, wherein said obtaining step includes selecting a color for signals of positive mean velocities that is the same as a color for signals of negative mean velocities.

9. The method of claim 1, wherein said display feature is color, and wherein said color includes red, green, blue and/or grey scale.

10. The method of claim 1, wherein said space includes a base line region where no display feature is to be shown, and wherein said displaying step displays no display feature for each signal whose energy related parameter and mean velocity related parameter correspond to a point in the base line region.

11. A method for identifying display features for displaying signals containing information on mean velocities and energies of fluid flow or tissue motion, comprising the steps of:
providing a boundary in a two variable two-dimensional map of display features, said variables being a mean velocity related parameter and an energy related parameter, each of the energy related parameter and the magnitude of the mean velocity related parameter having a minimum value at a point defining an origin in said map, said boundary dividing said map into at least a first and a second region, said first region containing the origin; and
obtaining for each signal a display feature that is a function only of the energy related parameter when the energy related parameter and the mean velocity related parameter of the information in such signal correspond to a point in the first region.

12. The method of claim 11, wherein said obtaining step obtains for each signal a display feature that is a function only of the mean velocity related parameter when the energy related parameter and the mean velocity related parameter of the information in such signal correspond to a point in the second region.

13. The method of claim 11, wherein said obtaining step obtains for each signal a display feature that is a function of both the energy related and mean velocity related parameters when the energy related and mean velocity related parameters of the information in such signal correspond to a point in the second region.

14. The method of claim 1, said display feature being color, wherein said obtaining step performs a filtering process in a transition area including said boundary to achieve a smoother color transition.

15. The method of claim 14, said filtering process including the following steps:
generating a lookup table based on the boundary provided;
defining a transition zone including the boundary; and
for each signal corresponding to a point in the transition zone, averaging color values at such point in the table with color values at neighboring points in the table to obtain a filtered color value for the display feature at such point.

16. The method of claim 11, further comprising altering the boundary prior to the obtaining step.

17. The method of claim 11, said display feature being color, wherein said obtaining step includes selecting a color for signals of positive mean velocities that is different from a color for signals of negative mean velocities.

18. The method of claim 11, said display feature being color, wherein said obtaining step includes selecting a color for signals of positive mean velocities that is the same as a color for signals of negative mean velocities.

19. The method of claim 11, wherein said display feature is color, and wherein said color includes red, green, blue and/or grey scale.

20. The method of claim 11, wherein said map includes a baseline region where no display feature is to be shown, and wherein said obtaining step obtains a null display feature for each signal whose energy related parameter and mean velocity related parameter correspond to a point in the base line region.

21. A method for displaying information comprising the steps of:
supplying a plurality of signals containing information, said information including mean velocity and energy of fluid flow or tissue motion;
providing a boundary in a two variable two-dimensional map of display features, said variables being a mean velocity related parameter and an energy related parameter, said boundary including pairs of threshold values of the mean velocity related parameter and the energy related parameter, said boundary being a single valued function of the energy related parameter or the mean velocity related parameter;
comparing the mean velocity related parameter and the energy related parameter of the information in each of the signals with the threshold values of said boundary;
performing at least one of the following steps: selecting for each signal a display feature that is a function only of the energy related parameter when the energy related parameter of the information in such signal is below the energy related parameter of a threshold pair that has the same mean velocity related parameter as the information of such signal when said boundary is a single valued function of the mean velocity related parameter, or selecting for each signal a display feature that is a function only of the energy related parameter when the magnitude of the mean velocity related parameter of such signal is less than the magnitude of the mean velocity related parameter of a threshold pair that has the same energy related parameter as such signal when said boundary is a single valued function of the energy related parameter; and
displaying said display feature for each signal on a display medium.

22. A method for displaying information comprising the steps of:
providing signals containing information on mean velocity and energy of fluid flow or tissue motion;
selecting colors to represent the signals by mapping the information of each of the signals onto a two variable two-dimensional color space, said two variables being a mean velocity related parameter and an energy related parameter, said mapping being performed according to a function where luminance of the color increases monotonically with the energy related parameter and/or magnitude of the mean velocity related parameter of the information in the signals; and
displaying said colors for said signals on a display medium.

23. The method of claim 22, wherein said color space is YUV space, Z varying with U and V, and wherein said selecting step maps according to a function given by:

$$Y = F(e, v, b),$$

where F increases monotonically with e, v;

$$Z=G(\text{sign of}(v))*H(e, \text{abs}(v),b)$$

where e, v are the energy related parameter and the mean velocity related parameter, abs(v) is the magnitude of v, and F,G,H are quantities that vary with e, v, b; and b is a user-alterable constant.

24. The method of claim 23, wherein said selecting step comprises altering b prior to mapping according to said function.

25. The method of claim 24, wherein said selecting step includes:
   obtaining Ye, Ze as functions of e, and Yv, Zv as functions of v, where Ze, Zv are complex combinations of U, V; and
   deriving Y as a function of Ye, Yv and b and deriving Z as a function of Ze, Zv and b, where b has a value in the range 0 to 1.

26. The method of claim 25, wherein said deriving step derives Y, Z according to one or more of the following relations:

$$Z=b*Ze+(1-b)*Z_v;$$

or $$Z=(Ze+Zv)/2;$$

and $$Y=\{b*Ye^n+(1-b)*Yv^n\}^{1/m}; n,m=1,2,3,$$

or $$Y=Ye^{b}*Yv^{(1-b)}.$$

27. A method for identifying colors for displaying signals containing information on mean velocities and energies of fluid flow or tissue motion, comprising the steps of:
   providing a function where luminance of the color increases monotonically with an energy related parameter and/or magnitude of a mean velocity related parameter of information in the signals; and
   selecting colors to represent the signals to be displayed by mapping the mean velocity related parameter and the energy related parameter information of each of the signals onto a two variable two-dimensional color space, said two variables being the mean velocity related parameter and the energy related parameter, said mapping being performed according to said function.

28. The method of claim 27, wherein said color space is YUV space, Z varying with U and V, and wherein said selecting step maps according to a function given by:

$$Y=F(e,v,b),$$

where F increases monotonically with e, v;

$$Z=G(\text{sign of }(v))*H(e, \text{abs}(v),b)$$

where e, v are the energy related parameter and the mean velocity related parameter, abs(v) is the magnitude of v, and F,G,H are quantities that vary with e, v, b and b is a user-alterable constant.

29. The method of claim 28, wherein said selecting step comprises altering b prior to mapping according to said function.

30. The method of claim 29, wherein said selecting step includes:
   obtaining Ye, Ze as functions of e, and Yv, Zv as functions of v, where Ze, Zv are complex combinations of U, V; and
   deriving Y as a function of Ye, Yv and b and deriving Z as a function of Ze, Zv and b, where b has a value in the range 0 to 1.

31. The method of claim 30, wherein said deriving step derives Y, Z according to one or more of the following relations:

$$Z=b*Ze+(1-b)*Zv;$$

or $$Z=(Ze+Zv)/2;$$

and $$Y=\{b*Ye^n+(1-b)*Yv^n\}^{1/m}; n,m=1,2,3,$$

or $$Y=Ye^{b}*Yv^{(1-b)}.$$

32. A method for displaying information comprising the steps of:
   supplying a plurality of signals containing information, said information including mean velocity and energy of fluid flow or tissue motion;
   providing a two variable two-dimensional map of display features, said variables being a mean velocity related parameter and an energy related parameter, each of the energy related parameter and the magnitude of the mean velocity related parameter having a minimum value at a point defining an origin in the map;
   selecting for each signal a display feature that is a function of both the energy related parameter and the mean velocity related parameter of the information in such signal when the energy related parameter and the mean velocity related parameter of the information in such signal correspond to any point in a region containing the origin of the two variable display feature map; and
   displaying said display feature for each signal on a display medium.

33. The method of claim 32, wherein said region is substantially the same as the two variable display feature map.

34. The method of claim 32, said display feature being color and said display feature map being a color map, said color having luminance and chrominance values, said selecting step including representing the magnitude of the mean velocity related parameter of each of said signals as the luminance of a color in said color map and selecting the chrominance of such color as a function of the mean velocity related parameter and the energy related parameter of the information in such signal, wherein said selecting step selects at least two different pairs of non-zero luminance and chrominance values corresponding to the same value of the mean velocity related parameter but two different values of the energy related parameter.

35. The method of claim 32, wherein said map includes a base line region where no display feature is to be shown, and wherein said displaying step displays no display feature for each signal whose energy related parameter and mean velocity related parameter correspond to a point in the base line region.

36. A method for displaying information comprising the steps of:

supplying a plurality of signals containing information, said information including mean velocity and energy of fluid flow or tissue motion;

providing a two variable two-dimensional map of display features, said variables being a mean velocity related parameter and an energy related parameter, the magnitude of the mean velocity related parameter having a first range of values and the energy related parameter having a second range of values for said plurality of signals;

selecting for each signal a display feature that is a function of both the energy related parameter and the mean velocity related parameter of the information in such signal when the energy related parameter and the mean velocity related parameter of the information in such signal are within a region in the lower half of said ranges of values; and displaying said display feature for each signal on a display medium.

37. The method of claim 36, wherein said first range of the magnitude of the mean velocity related parameter is 0 to about 10 m/sec.

38. The method of claim 36, wherein said selecting step selects for each signal a display feature that is a function of both the energy related parameter and the mean velocity related parameter of the information in such signal when the energy related parameter and the mean velocity related parameter of the information in such signal are within any region in said ranges of values.

39. The method of claim 36, wherein said map includes a base line region where no display feature is to be shown, and wherein said displaying step displays no display feature for each signal whose energy related parameter and mean velocity related parameter correspond to a point in the base line region.

40. A method for displaying information comprising the steps of:

providing a plurality of signals containing information on mean velocity and energy of fluid flow or tissue motion, said plurality of signals having a first range of values for a mean velocity related parameter and a second range of values for an energy related parameter;

selecting display features to represent the signals by mapping the mean velocity related parameter and the energy related parameter information of each of the signals onto a two-dimensional display feature space according to a mapping function, wherein said mapping function is substantially continuous over a substantial portion of the display feature space; and displaying said selected display features for said signals on a display medium.

41. The method of claim 40, said plurality of signals having a finite first range of values for the mean velocity related parameter and a finite second range of values for the energy related parameter, said display feature in said space having a finite range of values corresponding to the first and second ranges of values, wherein resolution of the display feature space is such that the parameters of said signals change by less than ⅛ of their finite ranges, and the display feature changes by less than 1/16 of its finite range.

42. A method for displaying information comprising the steps of:

supplying a plurality of signals containing information, said information including mean velocity and energy of fluid flow or tissue motion;

providing a two variable two-dimensional color map, said variables being a mean velocity related parameter and an energy related parameter and having minimum magnitude values at a point defining an origin in said map;

selecting from the map for each signal a color and representing a luminance of such color within a map region containing the origin as a function of the mean velocity related parameter and the energy related parameter of the information in such signal, wherein said selecting step selects a first and a second different non-zero luminance value corresponding respectively to a first and a second different value of the energy related parameter and to the same mean velocity related parameter value; and displaying said color for each signal on a display medium.

43. The method of claim 42, wherein said selecting step includes representing chrominance of such color as a function of the mean velocity related parameter and the energy related parameter of the information in such signal in said color map.

44. The method of claim 42, wherein said selecting step includes representing luminance of such color as a function of the product of the magnitude of the mean velocity related parameter and the energy related parameter of the information in such signal in said color map.

45. A method for identifying display features for displaying signals containing information on mean velocities and energies of fluid flow or tissue motion, comprising the steps of:

providing a two variable two-dimensional display feature space, said variables being a mean velocity related parameter and an energy related parameter, each of the energy related parameter and the magnitude of the mean velocity related parameter having a minimum value at a point defining an origin in the space; and selecting for each signal a display feature that is a function of both the energy related parameter and the mean velocity related parameter of the information in such signal when the energy related parameter and the mean velocity related parameter of the information in such signal correspond to any point in a region containing the origin of the two variable two-dimensional display feature space.

46. The method of claim 45, wherein said region is substantially the same as the two-dimensional display feature space.

47. The method of claim 45, wherein said display feature is a color and said display feature space is a color space, said color having luminance and chrominance values, wherein said selecting step includes representing the magnitude of the mean velocity related parameter of each of said signals as the luminance of a color in said color space and selecting chrominance of such color as a function of the mean velocity related parameter and the energy related parameter of the information in such signal, wherein said selecting step selects at least two different pairs of non-zero luminance and chrominance values corresponding to the same mean velocity value but two different values of the energy related parameter.

48. The method of claim 45, wherein said space includes a base line region where no display feature is to be shown, and wherein said selecting step selects a null display feature for each signal whose energy related parameter and mean velocity related parameter correspond to a point in the base line region.

49. A method for identifying display features for displaying a plurality of signals containing information on mean velocities and energies of fluid flow or tissue motion, comprising the steps of:

providing a two variable two-dimensional display feature space, said variables being a mean velocity related parameter and an energy related parameter, the magnitude of the mean velocity related parameter having a first range of values and the energy related parameter having a second range of values for said plurality of signals; and selecting for each signal in said plurality of signals a display feature that is a function of both the energy related parameter and the mean velocity related parameter of the information in such signal when the energy related parameter and the mean velocity related parameter of the information in such signal are within a region in the lower half of said ranges of values.

50. The method of claim 49, wherein said predetermined range of the magnitude of the mean velocity related parameter is 0 to about 10 m/sec.

51. The method of claim 49, wherein said selecting step selects for each signal in said plurality of signals a display feature that is a function of both the energy related parameter and the mean velocity related parameter of the information in such signal when the energy related parameter and the mean velocity related parameter of the information in such signal are within any region in said ranges of values.

52. The method of claim 49, wherein said space includes a base line region where no display feature is to be shown, and wherein said selecting step selects a null display feature for each signal in said plurality of signals whose energy related parameter and mean velocity related parameter correspond to a point in the base line region.

53. A method for identifying display features for displaying a plurality of signals containing information on parameters related to fluid flow or tissue motion, comprising the steps of:

providing a two variable two-dimensional map of display features, said map including an origin defined by minimum values of said parameters; and selecting display features to represent the signals by mapping two of said parameters of each of the signals onto the display feature map according to a mapping function, wherein said mapping function is substantially continuous substantially over the entire map, including over a region containing the origin.

54. The method of claim 53, said plurality of signals having a finite range of values for the two parameters, said display feature in said map having a finite range of values, wherein resolution of the display feature map is such that the parameters of said signals change by less than ⅛ of their finite ranges, and the display feature changes by less than 1/16 of its finite range.

55. A method for identifying display features for displaying a plurality of signals containing information on mean velocities and energies of fluid flow or tissue motion, comprising the steps of:

providing a two variable two-dimensional color space, said variables being a mean velocity related parameter and an energy related parameter; and selecting for each signal a color and representing the luminance of such color as a function of the mean velocity related parameter and the energy related parameter over substantially the entire color space, wherein said selecting step selects a first and a second different non-zero luminance value corresponding to respectively a first and a second different energy related parameter value and the same mean velocity related parameter value.

56. The method of claim 55, wherein said selecting step selects for each signal a color by representing the luminance of such color as a function of the product of the magnitude of the mean velocity related parameter and the energy related parameter of the information in such signal in said color space.

57. The method of claim 55, wherein said selecting step includes representing chrominance of such color as a function of the mean velocity related parameter and the energy related parameter of the information in such signal in said color space.

58. A method for identifying colors for displaying a plurality of signals containing information on mean velocities and energies of fluid flow or tissue motion, comprising the steps of:

forming a one-dimensional mean velocity related parameter YUV map and a one-dimensional energy related parameter YUV map of said signals to colors in YUV space; and constructing a two-dimensional mean velocity related parameter and energy related parameter YUV map from said mean velocity related parameter and the energy related parameter maps to identify colors for displaying said signals.

59. The method of claim 58, wherein said forming step forms the mean velocity related parameter and the energy related parameter maps as one-dimensional lookup tables, the constructing step employing the values in the one-dimensional lookup tables as starting entries for the two-dimensional mean velocity related parameter and the energy related parameter YUV map.

60. A method for displaying information comprising:

providing a plurality of signals containing information on mean velocity and energy of fluid flow or tissue motion;

selecting display features to represent the plurality of signals by mapping said information of each of the plurality of signals onto a two variable two-dimensional display feature space, said two variables being a mean velocity related parameter and an energy related parameter, said mapping being performed according to a function where the display feature is a function of the mean velocity related parameter and the energy related parameter information of the signals;

wherein said selecting step includes the step of a user altering the function to increase or decrease dependence of the display feature selected on the energy related parameter information compared to dependence of the display feature selected on the mean velocity related parameter information so that the display feature selected is the altered function of both the mean velocity and energy related parameters over a substantial portion of the display feature space; and displaying said display features for said plurality of signals on a display medium.

61. The method of claim 60, wherein said selecting step includes the steps of:

providing a boundary in the display feature space, each of the magnitude of the mean velocity related parameter and energy related parameter having a minimum value at a point defining an origin in the space, said boundary dividing said space into at least a first and a second region, said first region containing the origin; and obtaining for each signal in said plurality of signals a display feature that is a function only of the energy related parameter when the energy related parameter and the mean velocity related parameter of the information in such signal correspond to a point in the first region.

62. The method of claim 60, wherein said selecting step includes the step of providing a boundary in the display feature space, wherein said altering step includes moving said boundary in said space to enlarge or reduce the first and second regions.

63. The method of claim 60, wherein said function is a function of a user-alterable quantity b ranging from substantially total dependence on the mean velocity related parameter to substantially total dependence on the energy related parameter, wherein said altering step includes altering the value of b.

64. A method for identifying colors for displaying a plurality of signals containing information on mean velocities and energies of fluid flow or tissue motion, comprising the steps of:
providing a two variable map of display features, said variables being a mean velocity related parameter and an energy related parameter, said energy related parameter having a range of values, and a function where, for relatively low energy values within the range, a display feature is a function of a mean velocity related parameter and an energy related parameter information of the signals; and
selecting display features to represent the plurality of signals by mapping the information of each of the signals onto said display feature map according to said function; and
wherein said selecting step includes the step of altering the function to increase or decrease dependence of the display feature selected on the energy related parameter information compared to dependence of the display feature selected on the mean velocity related parameter information so that the display feature selected is the altered function of both the mean velocity and energy related parameters.

65. The method of claim 64, wherein said map is two-dimensional, said two variables defining two axes of the map, and wherein said selecting step includes the steps of:
providing a boundary in the display feature map, each of the magnitude of the mean velocity related parameter and the energy related parameter having a minimum value at a point defining an origin in the map, said boundary dividing said map into at least a first and a second region, said first region containing the origin; and
obtaining for each signal of said plurality of signals a display feature that is a function only of the energy related parameter when the energy related parameter and the mean velocity related parameter of the information in such signal correspond to a point in the first region.

66. The method of claim 64, wherein said selecting step includes the step of providing a boundary in the display feature space, said boundary dividing said map into at least a first and a second region, wherein said altering step includes moving said boundary in said map to enlarge or reduce the first and second regions.

67. The method of claim 64, wherein said function is a function of a user-alterable quantity b ranging from substantially total dependence on the mean velocity related parameter to substantially total dependence on the energy related parameter, wherein said altering step includes altering the value of b.

68. An apparatus for displaying information comprising:
means for storing a function for deriving display features from signals containing information on at least two of three quantities: mean velocity related parameter, variance of velocity related parameter and energy related parameter of fluid flow or tissue motion;
means responsive to user input for altering the function to increase or decrease dependence of the display feature on one quantity relative to dependence of the display feature on another quantity so that the display feature selected is the altered function of at least two of the three quantities; and
a display medium displaying said display features for said signals.

69. A method for displaying information comprising:
storing a function for deriving display features from signals containing information on at least two of three quantities related to fluid flow or tissue motion, each quantity having a range of magnitude values;
altering the function according to user input to increase or decrease dependence of the display feature on one quantity relative to dependence of the display feature on another quantity so that the display feature selected is the altered function of at least two of the three quantities over a substantial portion of the ranges of the values of the quantities; and
displaying said display features for said signals on a display medium.

70. An apparatus for identifying display features for displaying signals containing information related to fluid flow or tissue motion, comprising:
means for storing a function for deriving display features from signals containing information on at least two quantities related to fluid flow or tissue motion, each quantity having a range of magnitude values; and
means responsive to user input for altering the function to increase or decrease dependence of the display feature on one quantity relative to dependence of the display feature on another quantity so that the display feature selected is the altered function of the at least two quantities over substantially the lower half of the ranges of the values of the quantities.

71. A method for identifying display features for displaying signals containing information related to fluid flow or tissue motion, comprising the steps of:
storing a function for deriving display features from signals containing information on at least two quantities related to fluid flow or tissue motion, each quantity having a range of magnitude values; and
altering the function according to user input to increase or decrease dependence of the display feature on one quantity relative to dependence of the display feature on another quantity so that the display feature selected is the altered function of the at least two quantities over substantially the lower half of the ranges of the values of the quantities.

72. A method for enabling information to be displayed, comprising:
(a) supplying a plurality of signals containing information on fluid flow or tissue motion;
(b) providing a plurality of display feature maps for mapping a display feature to a pair of parameter values, said maps including at least one map employing a threshold mode function and at least one map employing a mixed mode function;

(c) activating a first one of said maps in response to user input; and (d) selecting for each of said plurality of signals a first set of display features using said activated map.

73. The method of claim 72, further comprising:

(f) activating a second hybrid map; and (g) selecting for each signal a second set of display features using said hybrid map.

74. The method of claim 72, further comprising altering the activated map according to user input to increase or decrease dependence of the display feature on one quantity relative to dependence of the display feature on another quantity.

75. A method for identifying display features for displaying signals containing information on fluid flow or tissue motion, comprising the steps of:

providing a plurality of display feature maps for mapping a color to a pair of parameter values relating to fluid flow or tissue motion, said maps including at least one map employing a threshold mode function and at least one map employing a mixed mode function, wherein said threshold mode function includes at least two regions for mapping colors; and storing said maps in a storage medium.

76. The method of claim 75, further comprising altering the activated map according to user input to increase or decrease dependence of the display feature on one quantity relative to dependence of the display feature on another quantity.

77. The method of claim 21, wherein said selecting step selects for each signal a display feature that is a function only of the mean velocity related parameter when at least one of the following conditions is satisfied: (c) the energy related parameter of the information in such signal is above the energy related parameter of a threshold pair that has the same mean velocity related parameter as the information of such signal or (d) the magnitude of the mean velocity related parameter of such signal is greater than the magnitude of mean velocity related parameter of a threshold pair that has the same energy related parameter as such signal.

78. The method of claim 21, wherein said selecting step selects for each signal a display feature that is a function of both the energy related parameter and the mean velocity related parameter when at least one of the following conditions is satisfied: (c) the energy related parameter of the information in such signal is above the energy related parameter of a threshold pair that has the same mean velocity related parameter as the information of such signal or (d) the magnitude of the mean velocity related parameter of such signal is greater than the magnitude of the mean velocity related parameter of a threshold pair that has the same energy related parameter as such signal.

79. The method of claim 21, said display feature being color, wherein said selecting step performs a filtering process in a transition area including said boundary to achieve a smoother color transition.

80. The method of claim 79, wherein said filtering process includes the following steps:

generating a lookup table based on the boundary provided;

defining a transition zone including the boundary; and for each signal corresponding to a point in the transition zone, averaging color values at such point in the table with color values at neighboring points in the table to obtain a filtered color value for the display feature at such point.

81. The method of claim 21, further comprising altering the boundary prior to the selecting and displaying steps.

82. The method of claim 21, said display feature being color, wherein said obtaining step includes selecting a color for signals of positive mean velocities that is different from a color for signals of negative mean velocities.

83. The method of claim 21, said display feature being color, wherein said obtaining step includes selecting a color for signals of positive mean velocities that is the same as a color for signals of negative mean velocities.

84. The method of claim 21, wherein said display feature is color, and wherein said color includes red, green, blue and/or grey scale.

85. The method of claim 21, wherein said space map includes a base line region where no display feature is to be shown, and wherein said displaying step displays no display feature for each signal whose energy related parameter and mean velocity related parameter correspond to a point in the base line region.

86. The method of claim 32, said function being substantially continuous.

87. The method of claim 36, said providing step providing a look up table.

88. The method of claim 53, wherein said parameters are mean velocity, variance of velocity and energy.

89. An apparatus for displaying information comprising:

means for supplying a plurality of signals containing information, said information including mean velocity and energy of fluid flow or tissue motion;

means for providing a boundary in a two variable two-dimensional display feature space, said variables being a mean velocity related parameter and an energy related parameter, each of the energy related parameter and the magnitude of the mean velocity related parameter having a minimum value at a point defining an origin in the space, said boundary dividing said space into at least a first and a second region, said first region containing the origin;

means for obtaining for each signal a display feature that is a function only of the energy related parameter when the energy related parameter and mean velocity related parameter of the information in such signal correspond to a point in the first region; and a display medium displaying said display feature for each signal.

90. An apparatus for displaying information comprising:

means for supplying a plurality of signals containing information, said information including mean velocity and energy of fluid flow or tissue motion;

means for providing a two variable two-dimensional map of display features, said variables being a mean velocity related parameter and an energy related parameter, each of the energy related parameter and the magnitude of the mean velocity related parameter having a minimum value at a point defining an origin in the map;

means for selecting for each signal a display feature that is a function of both the energy related parameter and the mean velocity related parameter of the information in such signal when the energy related parameter and the mean velocity related parameter of the information in such signal correspond to any point in a region containing the origin of the two variable display feature map; and a display medium displaying said display feature for each signal.

91. An apparatus for displaying information comprising:
means for supplying a plurality of signals containing information on a first and a second variable related to fluid flow or tissue motion;
means for providing a two variable two-dimensional map of display features, wherein the first variable has a first range of values and the second variable has a second range of values for said plurality of signals;
means for selecting for each signal a display feature that is a function of both variables only when the values of the two variables in such signal are within a region in the lower half of said ranges of values; and
a display medium displaying said display feature for each signal.

92. The apparatus of claim 91, wherein the first variable is a mean velocity related parameter, and a range of the magnitude of the mean velocity related parameter is 0 to about 10 m/sec.

93. An apparatus for displaying information comprising:
means for supplying a plurality of signals containing information, said information including mean velocity and energy of fluid flow or tissue motion;
means for providing a two variable two-dimensional color map, said variables being a mean velocity related parameter and an energy related parameter and having minimum magnitude values at a point defining an origin in said map;
means for selecting from the map for each signal a color and representing the luminance of such color within a map region containing the origin as a function of the mean velocity related parameter and the energy related parameter of the information in such signal, wherein said selecting means selects a first and a second different non-zero luminance value corresponding respectively to a first and a second different value of the energy related parameter and to the same mean velocity related parameter value; and
a display medium displaying said color for each signal.

94. A method for enabling ultrasound information to be displayed, comprising the steps of:
supplying a plurality of signals containing information, said information including mean velocity and energy of fluid flow or tissue motion;
providing a two variable two-dimensional map of display features, said variables being a mean velocity related parameter and an energy related parameter each having a range of values, said variables defining two axes of the map, wherein an area of said map covers substantially the ranges of values of the two variables; and
selecting from said area for each of said plurality of signals a display feature that varies with both the energy related parameter and the mean velocity related parameter.

95. A method for enabling ultrasound information to be displayed, comprising the steps of:
supplying a plurality of signals containing information on two variables suitable for display in a color Doppler velocity imaging mode and in a color Doppler energy imaging mode, said two variables each having a range of values;
providing a two-dimensional display feature map of said two variables; and
selecting for each of said plurality of signals a display feature that varies with both variables over substantially the lower half of the ranges of values of the two variables.

96. The method of claim 95, said two variables of said map being two of the following: mean velocity, variance of velocity and energy.

97. The method of claim 95, said selecting step selecting for each of said plurality of signals a display feature that varies with both variables over substantially the ranges of values of the two variables.

98. In an ultrasound imaging system having a transducer for transmitting an ultrasound signal and receiving a reflected ultrasound signal, an apparatus comprising:
signal processing circuitry for determining a Doppler energy-related parameter in response to the reflected signal;
color mapping circuitry for mapping the energy-related parameter to a corresponding mapped color for display; and
emphasis control circuitry for controlling visual distinctiveness of the mapped color, wherein a low emphasis emphasizes distinctions among high-energy reflected signals and a high emphasis emphasizes distinctions among both high and low-energy reflected signals.

99. The apparatus of claim 98, wherein the emphasis control circuitry controls luminance of the mapped color.

100. The apparatus of claim 98, wherein the emphasis control circuitry controls chrominance of the mapped color.

101. The apparatus of claim 98, wherein the emphasis control circuitry controls luminance and chrominance of the mapped color.

102. The apparatus of claim 98, wherein the color mapping circuitry includes a plurality of color maps, and the emphasis control circuitry selects a color map as a function of an emphasis setting.

103. The apparatus of claim 98, wherein the signal processing circuitry further determines a flow direction in response to the reflected signal, and the color mapping circuitry maps the energy-related parameter and the flow direction together to a corresponding color for display.

104. The apparatus of claim 103, wherein the flow direction depends upon the sign of a mean velocity-related parameter.

105. The apparatus of claim 98, wherein
the signal processing circuitry further determines a mean velocity-related parameter in response to the reflected signal, and
the color mapping circuitry maps the energy-related parameter to a first region in a color map, and maps the mean velocity-related parameter to a second region in the color map.

106. The apparatus of claim 98, wherein
the signal processing circuitry further determines a mean velocity-related parameter in response to the reflected signal, and
the color mapping circuitry maps the energy-related parameter to a first region in a color map, and maps the energy-related parameter and the mean velocity-related parameter together to a second region in the color map.

107. In an ultrasound imaging system having a transducer for transmitting an ultrasound signal and receiving a reflected ultrasound signal, a method for processing the reflected ultrasound signal for display, the method comprising the steps of:
determining a Doppler energy-related parameter in response to the reflected signal;
mapping the energy-related parameter to a corresponding mapped color for display; and emphasizing visual distinctiveness of the mapped color for high-energy reflected signals in response to a low emphasis setting; or emphasizing visual distinctiveness of the mapped color for both high and low-energy reflected signals in response to a high emphasis setting.

108. The method of claim 107, wherein the controlling step comprises the step of controlling luminance of the mapped color.

109. The method of claim 107, wherein the controlling step comprises the step of controlling chrominance of the mapped color.

110. The method of claim 107, wherein the controlling step comprises the step of controlling luminance and chrominance of the mapped color.

111. The method of claim 107, wherein the controlling step comprises the step of selecting a color map as a function of the emphasis setting.

112. The method of claim 107, further comprising the step of determining a flow direction in response to the reflected signal, wherein the mapping step comprises the step of mapping the energy-related parameter and the flow direction together to a corresponding color for display.

113. The method of claim 112, wherein the flow direction depends upon the sign of a mean velocity-related parameter.

114. The method of claim 107, further comprising the step of determining a velocity-related parameter in response to the reflected signal, wherein the mapping step comprises the step of mapping the energy-related parameter to a first region in a color map, and mapping the mean velocity-related parameter to a second region in the color map.

115. The method of claim 107, further comprising the step of determining a mean velocity-related parameter in response to the reflected signal, wherein the mapping step comprises the step of mapping the energy-related parameter to a first region in a color map, and mapping the energy-related parameter and the mean velocity-related parameter together to a second region in the color map.

116. In an ultrasound imaging system having a transducer for transmitting an ultrasound signal and receiving a reflected ultrasound signal, an apparatus comprising:

signal processing circuitry for determining a flow direction and a Doppler energy-related parameter in response to the reflected signal; and color mapping circuitry for mapping the flow direction, independent of flow speed, and the energy-related parameter to a corresponding color for display, wherein chrominance of the color varies as a function of the energy-related parameter.

117. The apparatus of claim 116, wherein the flow direction depends on the sign of a Doppler velocity-related parameter.

118. The apparatus of claim 116, wherein luminance and chrominance of the color vary as a function of the energy-related parameter.

119. The apparatus of claim 116, wherein the color mapping circuitry maps the energy-related parameter to a first or a second plurality of colors depending on whether the flow direction indicates a first or a second direction, respectively.

120. The apparatus of claim 116, further comprising emphasis control circuitry for controlling visual distinctiveness a of the mapped color.

121. The apparatus of claim 120, wherein a low emphasis emphasizes distinctions among high-energy reflected signals and a high emphasis emphasizes distinctions among both high and low-energy reflected signals.

122. The apparatus of claim 120, wherein the emphasis control circuitry controls luminance of the mapped color.

123. The apparatus of claim 120, wherein the emphasis control circuitry controls luminance and chrominance of the mapped color.

124. The apparatus of claim 120, wherein the color mapping circuitry includes a plurality of color maps, and the emphasis control circuitry selects a color map as a function of an emphasis setting.

125. In an ultrasound imaging system having a transducer for transmitting an ultrasound signal and receiving a reflected ultrasound signal, a method for processing the reflected ultrasound signal for display, the method comprising the steps of:

determining a flow direction and a Doppler energy-related parameter in response to the reflected signal; and mapping the flow direction, independent of flow speed, and the energy-related parameter to a corresponding color for display, wherein chrominance of the color varies as a function of the energy-related parameter.

126. The method of claim 125, wherein the flow direction depends on the sign of a Doppler velocity-related parameter.

127. The method of claim 125, wherein luminance and chrominance of the color vary as a function of the energy-related parameter.

128. The method of claim 125, wherein the mapping step comprises the step of mapping the energy-related parameter to a first or a second plurality of colors depending on whether the flow direction indicates a first or a second direction, respectively.

129. The method of claim 125, further comprising the step of controlling visual distinctiveness of the mapped color in response to an emphasis setting.

130. The method of claim 129, wherein the controlling step comprises at least one of the following steps:

emphasizing distinctions among high-energy reflected signals in response to a low emphasis setting; or emphasizing distinctions among both high and low-energy reflected signals in response to a high emphasis setting.

131. The method of claim 129, wherein the controlling step comprises the step of controlling luminance of the mapped color.

132. The method of claim 129, wherein the controlling step comprises the step of controlling luminance and chrominance of the mapped color.

133. The method of claim 129, wherein the controlling step comprises the step of selecting a color map as a function of the emphasis setting.

134. In an ultrasound imaging system having a transducer for transmitting an ultrasound signal and receiving a reflected ultrasound signal from tissue, an apparatus comprising:

signal processing circuitry for determining a flow direction and a Doppler energy-related parameter in response to the reflected signal;

color mapping circuitry for mapping the flow direction and the energy-related parameter to a corresponding color for display; and emphasis control circuitry for controlling visual distinctiveness of the mapped color.

135. In an ultrasound imaging system having a transducer for transmitting an ultrasound signal and receiving a reflected ultrasound signal from tissue, a method for processing the reflected ultrasound signal for display, the method comprising the steps of:

determining a flow direction and a Doppler energy-related parameter in response to the reflected signal;

mapping the flow direction and the energy-related parameter to a corresponding color for display and controlling visual distinctiveness of the mapped color in response to an emphasis setting.

136. The apparatus of claim 134, wherein a low emphasis emphasizes distinctions among high-energy reflected signals and a high emphasis emphasizes distinctions among both high and low-energy reflected signals.

137. The method of claim 135, wherein the controlling step comprises at least one of the following steps:

emphasizing distinctions among high-energy reflected signals in response to a low emphasis setting; or emphasizing distinctions among both high and low-energy reflected signals in response to a high emphasis setting.

138. An apparatus for displaying information comprising:

means for supplying a plurality of signals containing information, said information including mean velocity and energy of fluid flow or tissue motion;

means for providing a boundary in a two variable two-dimensional map of display features, said variables being a mean velocity related parameter and an energy related parameter, said boundary including pairs of threshold values of the mean velocity related parameter and the energy related parameter, said boundary being a single valued function of the mean velocity related parameter;

means for comparing the mean velocity related parameter and the energy related parameter of the information in each of the signals with the threshold values of said boundary;

means for selecting for each signal a display feature that is a function only of the energy related parameter when the energy related parameter of the information in such signal is below the energy related parameter of a threshold pair that has the same mean velocity related parameter as the information of such signal; and means for displaying said display feature for each signal on a display medium.

139. An apparatus for displaying information comprising:

means for supplying a plurality of signals containing information, said information including mean velocity and energy of fluid flow or tissue motion;

means for providing a boundary in a two variable two-dimensional map of display features, said variables being a mean velocity related parameter and an energy related parameter, said boundary including pairs of threshold values of the mean velocity related parameter and the energy related parameter, said boundary being a single valued function of the energy related parameter;

means for comparing the mean velocity related parameter and the energy related parameter of the information in each of the signals with the threshold values of said boundary;

means for selecting for each signal a display feature that is a function only of the energy related parameter when the magnitude of the mean velocity related parameter of such signal is less than the magnitude of the mean velocity related parameter of a threshold pair that has the same energy related parameter as such signal; and means for displaying said display feature for each signal on a display medium.

\* \* \* \* \*